(12) United States Patent
Nishihara et al.

(10) Patent No.: US 10,725,879 B2
(45) Date of Patent: Jul. 28, 2020

(54) RESOURCE MANAGEMENT APPARATUS, RESOURCE MANAGEMENT METHOD, AND NONVOLATILE RECORDING MEDIUM

(71) Applicant: Hitachi, Ltd., Chiyoda-ku, Tokyo (JP)

(72) Inventors: Yuta Nishihara, Tokyo (JP); Takashi Watanabe, Tokyo (JP); Shiori Inoue, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 137 days.

(21) Appl. No.: 16/118,933

(22) Filed: Aug. 31, 2018

(65) Prior Publication Data

US 2019/0114240 A1 Apr. 18, 2019

(30) Foreign Application Priority Data

Oct. 12, 2017 (JP) .................................. 2017-198588

(51) Int. Cl.
*G06F 11/00* (2006.01)
*G06F 11/20* (2006.01)
(Continued)

(52) U.S. Cl.
CPC ...... *G06F 11/2094* (2013.01); *G06F 11/0751* (2013.01); *G06F 11/1076* (2013.01); *G06F 11/3034* (2013.01); *G06F 11/3409* (2013.01); *G06F 11/3442* (2013.01); *G06F 11/3485* (2013.01); *G06F 2201/805* (2013.01); *G06F 2201/81* (2013.01); *G06F 2201/82* (2013.01)

(58) Field of Classification Search
CPC .. G06F 11/0751; G06F 11/1076; G06F 11/20; G06F 11/2053; G06F 11/2094; G06F 3/0631; G06F 3/067; G06F 3/0689
See application file for complete search history.

(56) References Cited

U.S. PATENT DOCUMENTS

| 9,519,556 B2 * | 12/2016 | Joshi ................... G06F 11/2094 |
| 2007/0079172 A1 * | 4/2007 | Rowe .................. G06F 11/2094 714/5.11 |

(Continued)

FOREIGN PATENT DOCUMENTS

JP 2005-216151 A 8/2005

*Primary Examiner* — Michael Maskulinski
(74) *Attorney, Agent, or Firm* — Procopio, Cory, Hargreaves & Savitch LLP

(57) ABSTRACT

A storage apparatus includes a plurality of resources including a plurality of types of surplus resources, determines a surplus resource introduction plan used for coping with abnormalities, and controls allocation of the surplus resources according to the determined introduction plan. The storage apparatus includes a processor. The processor detects an abnormality associated with the resource of the storage apparatus, calculates one or more surplus resource introduction plans capable of coping with the abnormality on the basis of management information of the resource of the storage apparatus when the abnormality is detected, and determines, when there are a plurality of introduction plans, an introduction plan used for coping with the abnormality on the basis of a state in which other abnormalities that are likely to occur concurrently with the abnormality can be coped with, by surplus resources remaining when the introduction plans are executed.

13 Claims, 29 Drawing Sheets

(51) Int. Cl.
*G06F 11/10* (2006.01)
*G06F 11/30* (2006.01)
*G06F 11/07* (2006.01)
*G06F 11/34* (2006.01)

(56) References Cited

U.S. PATENT DOCUMENTS

2009/0063768 A1* 3/2009 Kalos .................... G06F 3/0607
711/114
2010/0205372 A1* 8/2010 Daikokuya ........... G06F 3/0607
711/114

* cited by examiner

FIG.3

Pool management table 81

| # | Pool name | Physical volume name (Tier) | Physical capacity |
|---|-----------|-----------------------------|-------------------|
| 1 | Pool 01 | Physical volume 01(T1) | 500GB |
| 2 | Pool 02 | Physical volume 02(T1) | 400GB |

RAID Group management table 82

| | RAID Group name | Drive name | RAID Level |
|---|---|---|---|
| 1 | RAID Group01 | Drive 01, Drive 02, Drive 03, Drive 04, Drive 05, Drive 06 | RAID5(5D+1P) |
| 2 | RAID Group02 | Drive 07, Drive 08, Drive 09, Drive 10, Drive 11, Drive 12 | RAID6(4D+2D) |

Volume management table 83

| | Volume name | RAID Group name or Pool name | Capacity |
|---|---|---|---|
| 1 | Physical volume 01 | RAID Group01 | 500GB |
| 2 | Physical volume 02 | RAID Group02 | 400GB |
| 3 | Virtual volume 01 | Pool 01 | 1,000GB |
| 4 | Virtual volume 02 | Pool 01 | 1,000GB |
| 5 | Virtual volume 03 | Pool 02 | 1,000GB |
| 6 | Virtual volume 04 | Pool 02 | 1,000GB |

FIG.6

Drive management table 84

| # | Drive name | Drive type | Capacity | State | Spin up/down |
|---|---|---|---|---|---|
| 1 | Drive 01 | SSD | 100GB | NORMAL | Spin up |
| 2 | Drive 02 | SSD | 100GB | NORMAL | Spin up |
| 3 | Drive 03 | SSD | 100GB | NORMAL | Spin up |
| 4 | Drive 04 | SSD | 100GB | NORMAL | Spin up |
| 5 | Drive 05 | SSD | 100GB | NORMAL | Spin up |
| 6 | Drive 06 | SSD | 100GB | NORMAL | Spin up |
| 7 | Drive 07 | SSD | 100GB | NORMAL | Spin up |
| 8 | Drive 08 | SSD | 100GB | NORMAL | Spin up |
| 9 | Drive 09 | SSD | 100GB | NORMAL | Spin up |
| 10 | Drive 10 | SSD | 100GB | NORMAL | Spin up |
| 11 | Drive 11 | SSD | 100GB | NORMAL | Spin up |
| 12 | Drive 12 | SSD | 100GB | NORMAL | Spin up |
| 13 | Drive 13 | SSD | 100GB | NORMAL | Spin up |
| 14 | Drive 14 | SSD | 100GB | NORMAL | Spin up |
| 15 | Drive 15 | SSD | 100GB | NORMAL | Spin up |
| 16 | Drive 16 | SSD | 100GB | NORMAL | Spin up |
| 17 | Drive 17 | SSD | 100GB | NORMAL | Spin up |
| 18 | Drive 18 | SSD | 100GB | NORMAL | Spin up |
| 19 | Drive 19 | SSD | 100GB | NORMAL | Spin up |
| 20 | Drive 20 | SSD | 100GB | NORMAL | Spin up |
| 21 | Drive 21 | SAS | 200GB | NORMAL | Spin up |
| 22 | Drive 22 | SAS | 200GB | NORMAL | Spin up |
| 23 | Drive 23 | SAS | 200GB | NORMAL | Spin up |
| 24 | Drive 24 | SAS | 200GB | NORMAL | Spin up |
| 25 | Drive 25 | SAS | 200GB | NORMAL | Spin up |
| 26 | Drive 26 | SAS | 200GB | NORMAL | Spin up |
| 27 | Drive 27 | SAS | 200GB | NORMAL | Spin up |

FIG.7

Pool monitoring table 85

| # | Pool name | Usage rate | Allocation volume name (rate) | Threshold [warning] | Threshold [abnormality] | Capacity change rate [short-term (interval)] |
|---|---|---|---|---|---|---|
| 1 | Pool 01 | 50% | Physical volume 01(100%) | 80% | 95% | 0%(15min) |
| 2 | Pool 02 | 50% | Physical volume 02(100%) | 80% | 95% | 0%(15min) |

FIG.8

Drive monitoring table 86

| | 86a | 86b | 86c | 86d | 86e | 86f |
|---|---|---|---|---|---|---|
| # | Drive name | Operation rate | Threshold [warning] | Threshold [abnormality] | Operation rate change rate [short term] (interval) |
| 1 | Drive 01 | 20% | 60% | 80% | 0%(15min) |
| 2 | Drive 02 | 20% | 60% | 80% | 0%(15min) |
| 3 | Drive 03 | 20% | 60% | 80% | 0%(15min) |
| 4 | Drive 04 | 20% | 60% | 80% | 0%(15min) |
| 5 | Drive 05 | 20% | 60% | 80% | 0%(15min) |
| 6 | Drive 06 | 20% | 60% | 80% | 0%(15min) |
| 7 | Drive 07 | 10% | 60% | 80% | 0%(15min) |
| 8 | Drive 08 | 10% | 60% | 80% | 0%(15min) |
| 9 | Drive 09 | 10% | 60% | 80% | 0%(15min) |
| 10 | Drive 10 | 10% | 60% | 80% | 0%(15min) |
| 11 | Drive 11 | 10% | 60% | 80% | 0%(15min) |
| 12 | Drive 12 | 10% | 60% | 80% | 0%(15min) |
| 13 | Drive 13 | 0% | 60% | 80% | 0%(15min) |
| 14 | Drive 14 | 0% | 60% | 80% | 0%(15min) |
| 15 | Drive 15 | 0% | 60% | 80% | 0%(15min) |
| 16 | Drive 16 | 0% | 60% | 80% | 0%(15min) |
| 17 | Drive 17 | 0% | 60% | 80% | 0%(15min) |
| 18 | Drive 18 | 0% | 60% | 80% | 0%(15min) |
| 19 | Drive 19 | 0% | 60% | 80% | 0%(15min) |
| 20 | Drive 20 | 0% | 60% | 80% | 0%(15min) |
| 21 | Drive 21 | 0% | 60% | 80% | 0%(15min) |
| 22 | Drive 22 | 0% | 60% | 80% | 0%(15min) |
| 23 | Drive 23 | 0% | 60% | 80% | 0%(15min) |
| 24 | Drive 24 | 0% | 60% | 80% | 0%(15min) |
| 25 | Drive 25 | 0% | 60% | 80% | 0%(15min) |
| 26 | Drive 26 | 0% | 60% | 80% | 0%(15min) |
| 27 | Drive 27 | 0% | 60% | 80% | 0%(15min) |

FIG.9

Drive monitoring history table 87

| | 87a | 87b | 87c | 87d |
|---|---|---|---|---|
| | Drive name | Time | Operation rate |
| 1 | Drive 01 | 2017/01/01 12:00 | 20% |
| 2 | Drive 01 | 2017/01/01 11:59 | 20% |
| ... | ... | ... | ... |

FIG.10

Pool monitoring history table 88

| | 88a | 88b | 88c | 88d | 88e |
|---|---|---|---|---|---|
| # | Pool name | Time | Usage rate | Allocation volume (rate) |
| 1 | Pool 01 | 2017/01/01 12:00 | 50% | Physical volume 01(100%) |
| 2 | Pool 02 | 2017/01/01 12:00 | 50% | Physical volume 02(100%) |
| 3 | Pool 01 | 2017/01/01 11:59 | 50% | Physical volume 01(100%) |
| 4 | Pool 02 | 2017/01/01 11:59 | 50% | Physical volume 02(100%) |
| ... | ... | ... | ... | ... |

FIG.11

Fault table 69

| # | Fault type | Fault location | Concurrent fault |
|---|---|---|---|
| 1 | Performance deficiency | Pool 01 | #3(1/1), #4(1/1), #5(1/16), #6(1/16) |
| 2 | | Pool 02 | #3(1/1), #4, (1/1)#5(1/16), #6(1/16) |
| 3 | Capacity shortage | Pool 01 | #1(1/1) or #2(1/1), #4(1/1), #5(1/16), #6(1/16) |
| 4 | | Pool 02 | #1(1/1) or #2(1/1), #3(1/1), #5(1/16), #6(1/16) |
| 5 | Drive fault | Drive 01 to 18 | #1(1/1) or #2(1/1), #3(1/1), #4(1/1), #5(1/16), #6(1/16) |
| 6 | | Drive 19 to 24 | #1(1/1) or #2(1/1), #3(1/1), #4(1/1), #5(1/16), #6(1/16) |

FIG.12

RAID group type table 90

| | RAID Level | Reliability evaluation value | Performance evaluation value |
|---|---|---|---|
| 1 | RAID5(2D+1P) | 1 | 3 |
| 2 | RAID5(3D+1P) | 1 | 4 |
| 3 | RAID5(4D+1P) | 1 | 5 |
| 4 | RAID5(5D+1P) | 1 | 6 |
| 5 | RAID6(4D+2P) | 2 | 6 |
| 6 | RAID6(6D+2P) | 2 | 8 |

FIG.13

Drive type table 91

| # | Drive type (Capacity) | Spare drive type (Capacity) | Performance evaluation value | Performance ratio |
|---|---|---|---|---|
| 1 | SSD(100GB) | SSD(100GB) | 2 | 100 |
| 2 | SAS(200GB) | SAS(200GB) | 1 | 2 |
| 3 | NL-SAS(500GB) | NL-SAS(500GB) | 0 | 1 |

FIG.14

Tier type table 92

| # | Tier | Drive type |
|---|------|------------|
| 1 | Tier1 | SSD |
| 2 | Tier1 | SAS |
| 3 | Tier1 | NL-SAS |
| 4 | Tier1 | SSD, SAS |
| 5 | Tier1 | SSD, NL-SAS |
| 6 | Tier1 | SAS, NL-SAS |
| 7 | Tier1 | SSD, SAS, NL-SAS |
| 8 | Tier1<br>Tier2 | SSD<br>SAS |
| 9 | Tier1<br>Tier2 | SSD<br>NL-SAS |
| 10 | Tier1<br>Tier2 | SAS<br>NL-SAS |
| 11 | Tier1<br>Tier2 | SSD, SAS<br>NL-SAS |
| 12 | Tier1<br>Tier2 | SSD<br>SAS, NL-SAS |
| 13 | Tier1<br>Tier2<br>Tier3 | SSD<br>SAS<br>NL-SAS |

FIG.15

Resource introduction history table 93

| | Introduction time | Reclamation time | Fault location | Fault type | Introduced resource |
|---|---|---|---|---|---|
| 1 | 2017/01/01 12:00 | - | Pool 01 | Performance deficiency | Physical volume 03(500GB)<br>RAID Group03(RAID5(5D+1P))<br>Drive 13, Drive 14, Drive 15, Drive 16, Drive 17, Drive 18<br>Tier1 |
| 2 | 2016/12/01 11:00 | 2016/12/10 11:00 | Drive 10 | Drive replacement | Drive 13 |
| : | ... | ... | ... | ... | ... |

Page migration performance list table 94

| | Speed type | Speed |
|---|---|---|
| 1 | Low speed | 100Mbps |

Page migration performance influence list table 95

| # | RAID Level | Drive type | Low-speed load [migration destination/source] |
|---|---|---|---|
| 1 | RAID5(2D+1P) | SSD | +10%/+10% |
| 2 | RAID5(2D+1P) | SAS | +15%/+15% |
| 3 | RAID5(3D+1P) | SSD | +9%/+9% |
| 4 | RAID5(3D+1P) | SAS | +14%/+14% |
| 5 | RAID5(4D+1P) | SSD | +8%/+8% |
| 6 | RAID5(4D+1P) | SAS | +13%/+13% |
| 7 | RAID5(5D+1P) | SSD | +7%/+7% |
| 8 | RAID5(5D+1P) | SAS | +12%/+12% |
| 9 | RAID6(4D+2P) | SSD | +7%/+7% |
| 10 | RAID6(4D+2P) | SAS | +12%/+12% |
| 11 | RAID6(6D+2P) | SSD | +5%/+5% |
| 12 | RAID6(6D+2P) | SAS | +10%/+10% |

FIG.18

Resource introduction plan list table 96

| # | Evaluati on value | Fault # | Added volume (Capacity) | Added RAID Group | Added drive | Configuration change |
|---|---|---|---|---|---|---|
| 1 | 1 | 3 | Physical volume 03(500GB) | RAID5(5D+1P) | SSD × 6 | Create RAID Group, create physical volume, add physical volume to pool |
| 2 | 2 | 3 | Physical volume 03(400GB) | RAID5(4D+1P) | SSD × 5 | Create RAID Group, create physical volume, add physical volume to pool, and start page migration |
| 3 | 2 | 3 | Physical volume 03(300GB) | RAID5(3D+1P) | SSD × 4 | Create RAID Group, create physical volume, add physical volume to pool, and start page migration |
| 4 | 2 | 3 | Physical volume 03(200GB) | RAID5(2D+1P) | SSD × 3 | Create RAID Group, create physical volume, add physical volume to pool, and start page migration |
| 5 | 2 | 3 | Physical volume 03(1000GB) | RAID5(5D+1P) | SAS × 6 | Create RAID Group, create physical volume, add physical volume to pool, and start page migration |
| 6 | 2 | 3 | Physical volume 03(800GB) | RAID5(4D+1P) | SAS × 5 | Create RAID Group, create physical volume, add physical volume to pool, and start page migration |
| 7 | 2 | 3 | Physical volume 03(600GB) | RAID5(3D+1P) | SAS × 4 | Create RAID Group, create physical volume, add physical volume to pool, and start page migration |
| 8 | 2 | 3 | Physical volume 03(400GB) | RAID5(2D+1P) | SAS × 3 | Create RAID Group, create physical volume, add physical volume to pool, and start page migration |
| 9 | 2 | 3 | Physical volume 03(400GB) Physical volume 04(200GB) | RAID5(4D+1P) RAID5(2D+1P) | SSD × 5 SSD × 3 | Create RAID Group, create physical volume, add physical volume to pool, and start page migration Create RAID Group, create physical volume, add physical volume to pool, and start page migration |
| ... | ... | ... | ... | ... | ... | |

Configuration change time list table 97

| # | Configuration change | Time (min) |
|---|---|---|
| 1 | Create physical volume | 1 |
| 2 | Create RAID Group | 1 |
| 3 | Start page migration | 2 |
| 4 | Spin up | 2 |
| 5 | Add physical volume to pool | 1 |
| 6 | Start data migration to spare drive | 0.1 |

FIG.20

Configuration change means list table 98

| # | Fault type | Means | Configuration change |
|---|---|---|---|
| 1 | Capacity shortage | Add one physical volume to same tier as physical volume in which capacity is depleted | (Spin up) → create RAID Group → create physical volume → add physical volume to pool |
| 2 | | Add one physical volume to tier on higher layer than physical volume in which capacity is depleted | (Spin up) → create RAID Group → create physical volume → add physical volume to pool |
| 3 | | Add one physical volume to tier on lower layer than physical volume in which capacity is depleted | (Spin up) → create RAID Group → create physical volume → add physical volume to pool → start page migration |
| 4 | Performance deficiency | Add one physical volume to same tier as physical volume in which performance is deficient | (Spin up) → create RAID Group → create physical volume → add physical volume to pool |
| 5 | | Add one physical volume to tier on higher layer than physical volume in which performance is deficient | (Spin up) → create RAID Group → create physical volume → add physical volume to pool |
| 6 | Drive fault | Migrate data to equivalent drive | (Spin up) → start data migration to spare drive |
| 7 | | Migrate data to drive having equivalent or higher performance and capacity | (Spin up) → start data migration to spare drive |

RESOURCE MANAGEMENT APPARATUS, RESOURCE MANAGEMENT METHOD, AND NONVOLATILE RECORDING MEDIUM

CROSS-REFERENCE TO PRIOR APPLICATION

This application relates to and claims the benefit of priority from Japanese Patent Application No. 2017-198588 filed on Oct. 12, 2017, the entire disclosure of which is incorporated herein by reference.

BACKGROUND

The present invention relates to a resource management apparatus and the like for determining an introduction plan for surplus resources and allocating surplus resources according to the determined introduction plan.

As an IT resource management technique, a technique of dynamically changing allocation of IT resources to reduce a management cost of the IT resources has been considered. For example, a technique of virtualizing an entire storage system and allocating storage resources without changing the configuration of a business application when performance deteriorates or failures occur is known (for example, see Japanese Patent Application Publication No. 2005-216151).

SUMMARY

For example, in a storage apparatus including a plurality of storage devices (for example, drives), spare (replacement) drives for replacement with faulty drives are prepared in order to secure redundancy in the event of faults (abnormalities), and a faulty drive is switched to a spare drive when any one of drives is broken down. Moreover, in the storage apparatus, the performance and capacity necessary at a peak time are predicted to determine the number of drives that form a physical volume.

For example, as described above, when spare drives are prepared in advance, it is possible to cope with faults in a drive. However, when a drive is replaced, a spare drive needs to have a performance equivalent to an original drive and there is a problem that the cost increases.

In contrast, although the cost can be decreased by preparing drives having different performances, it is important to determine how these drives will be used. For example, when another abnormality occurs after a certain drive is used to cope with a certain abnormality, it may be difficult to cope with the other abnormality depending on the type of the drive used first.

The present invention has been made in view of the problems, and an object thereof is to provide a technique capable of increasing the possibility to cope with a plurality of abnormalities.

In order to attain the object, a resource management apparatus according to an aspect is a resource management apparatus that determines a surplus resource introduction plan used for coping with abnormalities in a storage apparatus including a plurality of resources including a plurality of types of surplus resources, and controls allocation of the surplus resources according to the determined introduction plan, the resource management apparatus includes a processor unit, wherein the processor unit is configured to: detect an abnormality associated with the resource of the storage apparatus; calculate one or more surplus resource introduction plans capable of coping with the abnormality on the basis of management information of the resource of the storage apparatus when the abnormality is detected; and determines, when there are a plurality of introduction plans, an introduction plan used for coping with the abnormality on the basis of a state in which other abnormalities that are likely to occur concurrently with the abnormality can be coped with, by surplus resources remaining when the introduction plans are executed.

According to the present invention, it is possible to increase the possibility to cope with a plurality of abnormalities.

BRIEF DESCRIPTION OF THE DRAWINGS

FIG. 3 is a diagram illustrating a configuration of a pool management table according to an embodiment;

FIG. 4 is a diagram illustrating a configuration of a RAID group management table according to an embodiment;

FIG. 5 is a diagram illustrating a configuration of a volume management table according to an embodiment;

FIG. 6 is a diagram illustrating a configuration of a drive management table according to an embodiment;

FIG. 7 is a diagram illustrating a configuration of a pool monitoring table according to an embodiment;

FIG. 8 is a diagram illustrating a configuration of a drive monitoring table according to an embodiment;

FIG. 9 is a diagram illustrating a configuration of a drive monitoring history table according to an embodiment;

FIG. 10 is a diagram illustrating a configuration of a pool monitoring history table according to an embodiment;

FIG. 11 is a diagram illustrating a configuration of a fault table according to an embodiment;

FIG. 12 is a diagram illustrating a configuration of a RAID group type table according to an embodiment;

FIG. 13 is a diagram illustrating a configuration of a drive type table according to an embodiment;

FIG. 14 is a diagram illustrating a configuration of a tier type table according to an embodiment;

FIG. 15 is a diagram illustrating a configuration of a resource introduction history table according to an embodiment;

FIG. 16 is a diagram illustrating a configuration of a page migration performance list table according to an embodiment;

FIG. 17 is a diagram illustrating a configuration of a page migration performance influence list table according to an embodiment;

FIG. 18 is a diagram illustrating a configuration of a resource introduction plan list table according to an embodiment;

FIG. 20 is a diagram illustrating a configuration of a configuration change means list table according to an embodiment;

DETAILED DESCRIPTION OF THE EMBODIMENT

Figure 1:
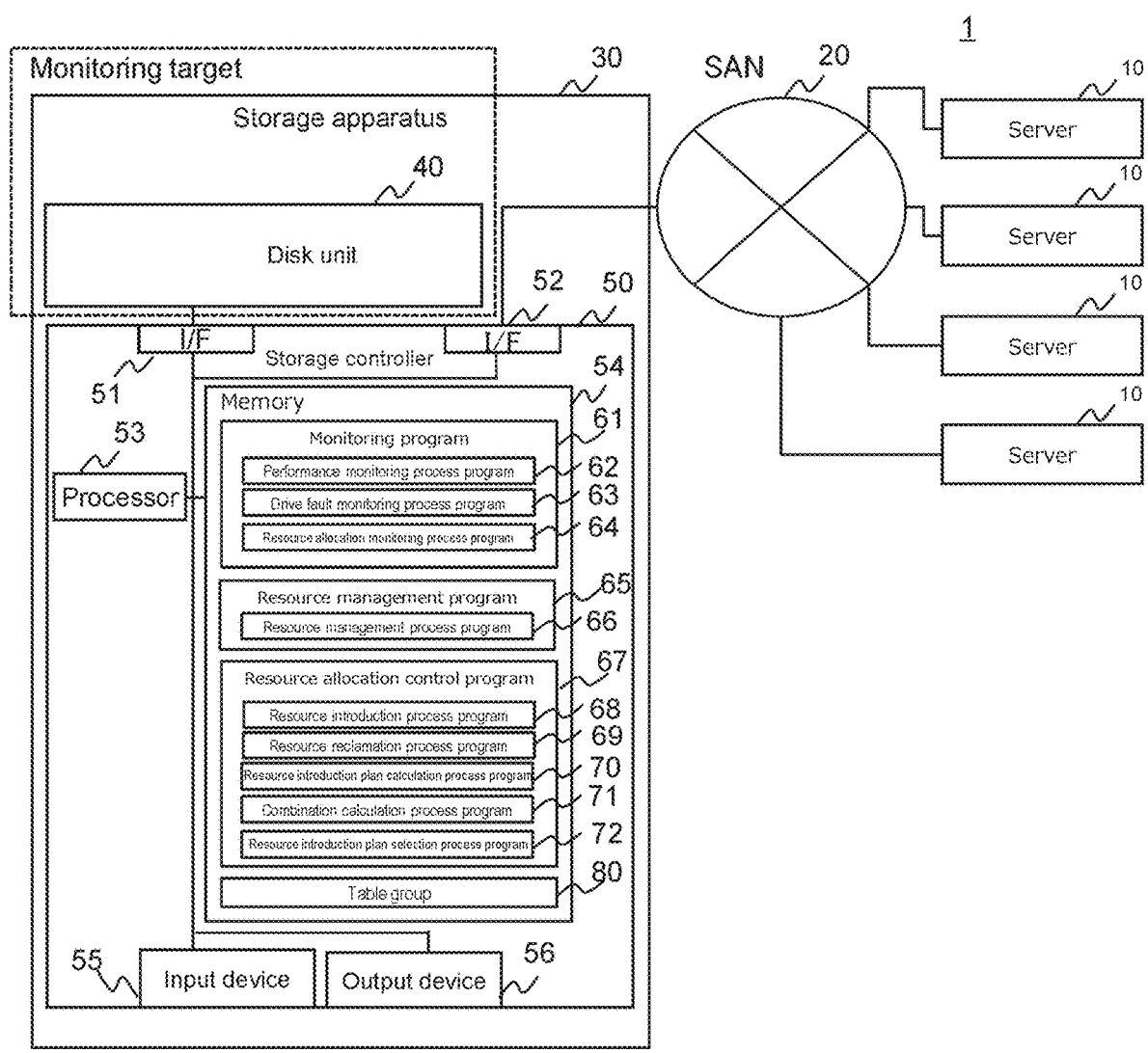
FIG. 1 is a diagram illustrating an overall configuration of a computer system according to an embodiment.

Hereinafter, embodiments will be described with reference to the drawings. The embodiments described below are not intended to limit the inventions according to the claims, and all elements and combinations thereof described in the embodiments are not necessarily essential to the solving means for the invention.

In the following description, although information is sometimes described using an expression of an "AAA table," the information may be expressed by an arbitrary data structure. That is, the "AAA table" may be referred to as "AAA information" in order to show that information does not depend on a data structure.

In the following description, a "processor unit" includes one or more processors. At least one processor is typically a microprocessor such as a CPU (Central Processing Unit). One or more processors may be single cores and may be multi-cores. The processor may include a hardware circuit that performs a part or all of the processes.

A part or all of the processes performed by the processor may be performed by a hardware circuit. A program executed by a processor may be installed from a program source. The program source may be a program distribution server or a storage medium (for example, a nonvolatile and portable storage medium).

Moreover, in the following description, "RAID" is an abbreviation of Redundant Array of Independent (or Inexpensive) Disks. A RAID group includes a plurality of physical devices (typically physical devices of the same type) and stores data according to a RAID level associated with the RAID group. A RAID group may be referred to as a parity group. A parity group may be a RAID group that stores a parity, for example.

In the following description, although names are used as identification information of elements, identification information of the other types maybe used instead of or in addition to the names. Moreover, in the following description, when the same types of elements are not distinguished from each other, reference numerals or common portions in the reference numerals may be used, whereas when the same types of elements are distinguished from each other, the reference numerals of the elements may be used or the names allocated to the elements may be used instead of the reference numerals.

FIG. 1 is a diagram illustrating an overall configuration of a computer system according to an embodiment.

A computer system 1 includes one or more servers 10 and a storage apparatus 30. The server 10 and the storage apparatus 30 are connected via a SAN (Storage Area Network) 20 as an example of a communication network.

The server 10 can execute various processes and writes data to a virtual volume 405 (see FIG. 2) of the storage apparatus 30 associated with processing and reads data from the virtual volume 405.

The storage apparatus 30 includes a disk unit 40 including a plurality of storage devices and a storage controller 50 as an example of a resource management apparatus.

The storage controller 50 includes a disk I/F (interface) 51, a communication I/F 52, a processor 53 as an example of a processor unit, a memory 54, an input device 55, and an output device 56.

The disk I/F 51 performs a process of transmitting data between the storage controller 50 and the disk unit 40.

The communication I/F 52 communicates with other devices (for example, the server 10) via the SAN 20.

The input device 55 is a mouse, a keyboard, and the like, for example, and receives various pieces of input data from an administrator of the storage apparatus 30. The output device 56 is a liquid crystal display, for example, and displays and outputs various pieces of information.

The processor 53 executes various processes according to a program stored in the memory 54.

The memory 54 is a RAM (RANDOM ACCESS MEMORY), for example, and stores a program executed by the processor 53, various tables, and necessary information. In the present embodiment, the memory 54 stores a monitoring program 61, a resource management program 65, a resource allocation control program 67, and a table group 80 (tables 81 to 98).

The monitoring program 61 includes a performance monitoring process program 62, a drive fault monitoring process program 63, and a resource allocation monitoring process program 64. The resource management program 65 includes a resource management process program 66. The resource allocation control program 67 includes a resource introduction process program 68, a resource reclamation process program 69, a resource introduction plan calculation process program 70, a combination calculation process program 71, and a resource introduction plan selection process program 72. Processes executed when the processor 53 executes the respective programs will be described later.

The table group 80 includes a pool management table 81, a RAID group management table 82, a volume management table 83, a drive management table 84, a pool monitoring table 85, a drive monitoring table 86, a drive monitoring history table 87, a pool monitoring history table 88, a fault table 89, a RAID group type table 90, a drive type table 91, a tier type table 92, a resource introduction history table 93, a page migration performance list table 94, a page migration performance influence list table 95, a resource introduction plan list table 96, a configuration change time list table 97, and a configuration change means list table 98. The details of the respective tables will be described later.

Figure 2:
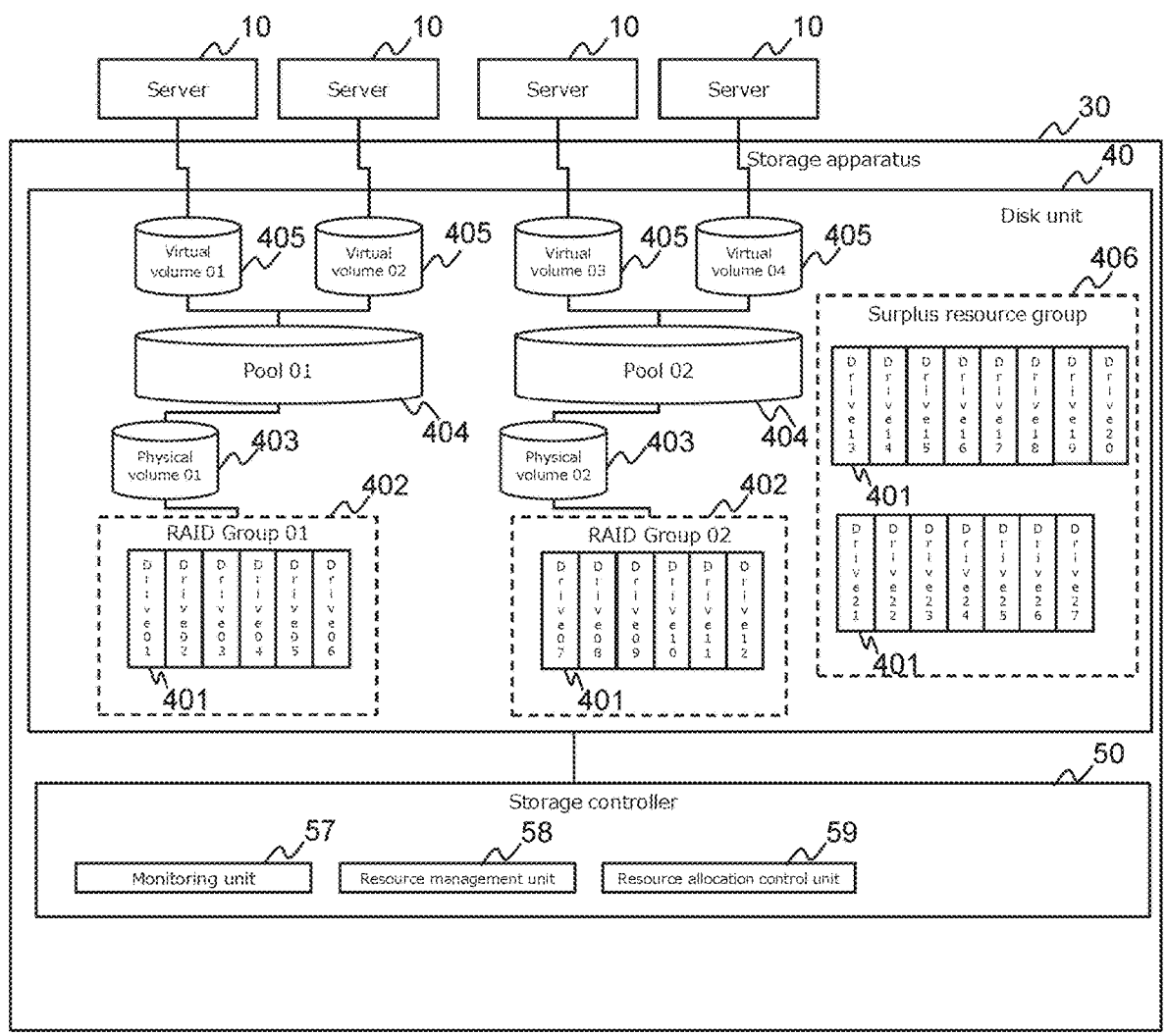
FIG. 2 is a diagram illustrating a configuration of resources of a storage apparatus according to an embodiment.

FIG. 2 is a diagram illustrating a configuration of resources of a storage apparatus according to an embodiment.

The storage controller 50 includes a monitoring unit 57, a resource management unit 58, and a resource allocation control unit 59. The monitoring unit 57 is configured when the processor 53 executes the monitoring program 61. The resource management unit 58 is configured when the processor 53 executes the resource management program 65. The resource allocation control unit 59 is configured when the processor 53 executes the resource allocation control program 67.

The disk unit 40 of the storage apparatus 30 includes a plurality of drives 401. The drive 401 is an example of a resource. The plurality of drives 401 may be drives having different types and performances. The drive 401 may be an HDD (Hard Disk Drive) or may be an SSD (Solid State Drive), for example. Moreover, when the drive 401 is an HDD, the drive 401 may include a SAS (Serial Attached SCSI) HDD and may include an NL-SAS (Near Line SAS) HDD, for example.

A plurality of drives 401 among the plurality of drives 401 are surplus resources prepared as a backup to cope with abnormalities in the storage apparatus 30 and are managed as a surplus resource group 406. In the present embodiment, the use of the drive 401 of the surplus resource group 406 is not limited to a specific use such as exclusively for replacement of drives, for example.

In the disk unit 40, one or more RAID groups 402 are formed by a plurality of drives 401. A physical volume 403 is formed on the basis of the storage area of the RAID group 402. Moreover, a pool (a capacity pool) 404 is formed on the basis of the storage area of the physical volume 403. The disk unit 40 includes one or more virtual volumes 405 which are provided to the server 10 (that is, which are accessed by the server 10). The storage area of the virtual volume 405 is managed as a plurality of pages. The storage area of the pool 404 is allocated to the virtual volume 405 in units of pages. Here, the RAID group 402, the physical volume 403, the pool 404, and the virtual volume 405, which are based on the storage area of the drive 401, are also examples of resources.

Next, a configuration of the respective tables belonging to the table group 80 will be described in detail.

FIG. 3 is a diagram illustrating a configuration of the pool management table according to an embodiment.

The pool management table 81 is a table for managing the respective pools 404 in the storage apparatus 30 and stores rows (records) corresponding to the respective pools 404. The row of the pool management table 81 includes the fields of number (#) 81*a*, pool name 81*b*, physical volume name (Tier) 81*c*, and physical capacity 81*d*.

The number of a row in the pool management table 81 is stored in the number (#) 81*a*. The name (a pool name) of the pool 404 corresponding to the row is stored in the pool name 81*b*. The name of a physical volume that forms the storage area of the pool 404 corresponding to the row and Tier (layer) of the pool 404 are stored in the physical volume name (Tier) 81*c*. A physical capacity of a storage area provided from a physical volume corresponding to the physical volume name of the physical volume name (Tier) 81*c* to the pool 404 corresponding to the row is stored in the physical capacity 81*d*.

FIG. 4 is a diagram illustrating a configuration of a RAID group management table according to an embodiment.

The RAID group management table 82 is a table for managing the respective RAID groups 402 in the storage apparatus 30 and stores rows (records) corresponding to the respective RAID groups 402. The row of the RAID group management table 82 includes the fields of number (#) 82*a*, RAID group name 82*b*, drive name 82*c*, and RAID level 82*d*.

The number of a row in the RAID group management table 82 is stored in the number (#) 82*a*. The name (a RAID group name) of the RAID group 402 corresponding to the row is stored in the RAID group name 82*b*. Drive names of the plurality of drives 41 that form the RAID group corresponding to the row are stored in the drive name 82*c*. The RAID level of the RAID group 402 corresponding to the row is stored in the RAID level 82*d*.

FIG. 5 is a diagram illustrating a configuration of a volume management table according to an embodiment.

The volume management table 83 is a table for managing the respective volumes (the physical volume 403 and the virtual volume 405) in the storage apparatus 30 and stores rows (records) corresponding to the respective volumes. The row of the volume management table 83 includes the fields of number (#) 83*a*, volume name 83*b*, RAID group name or pool name 83*c*, and capacity 81*d*.

The number of a row in the volume management table 83 is stored in the number (#) 83*a*. The name of a volume corresponding to the row is stored in the volume name 83*b*. The name of the RAID group 402 or the pool 404 that forms the storage area of a volume corresponding to the row is stored in the RAID group name or pool name 83*c*. The capacity of the storage area of the volume corresponding to the row is stored in the capacity 83*d*.

FIG. 6 is a diagram illustrating a configuration of a drive management table according to an embodiment.

The drive management table 84 is a table for managing the respective drives 401 in the storage apparatus 30 and stores rows (records) corresponding to the respective drives 401. The row of the drive management table 84 includes the fields of number (#) 84*a*, drive name 84*b*, drive type 84*c*, capacity 84*d*, state 84*e*, and spin up/down 84*f*.

The number of a row in the drive management table 84 is stored in the number (#) 84*a*. The name (a drive name) of a drive corresponding to the row is stored in the drive name 84*b*. A drive type of the drive 401 corresponding to the row is stored in the drive type 84*c*. When the drive 401 is an SSD, the drive type is SSD. When the drive 401 is a SAS HDD, the drive type is SAS. The capacity of the storage area of the drive 401 corresponding to the row is stored in the capacity 84*d*. The state of the drive 401 corresponding to the row is stored in the state 84*e*. The state of the drive 401 includes NORMAL indicating that the drive operates normally and ERROR indicating that an abnormality (fault) has occurred. Information indicating whether the drive 401 corresponding to the row spins up or down is stored in the spin up/down 84*f*.

FIG. 7 is a diagram illustrating a configuration of a pool monitoring table according to an embodiment.

The pool monitoring table 85 is a table for managing the latest operation information of respective pools 404 in the storage apparatus 30 and stores rows (records) corresponding to the respective pools 404. The row of the pool monitoring table 85 includes the fields of number (#) 85*a*, pool name 85*b*, usage rate 85*c*, allocation volume name (rate) 85*d*, threshold [warning] 85*e*, threshold [abnormality] 85*f*, and capacity change rate [short-term] (interval) 85*g*.

The number of a row in the pool monitoring table 85 is stored in the number (#) 85*a*. A pool name of the pool 404 corresponding to the row is stored in the pool name 85*b*. A usage rate (an example of operation information) of a storage area of the pool 404 corresponding to the row is stored in the usage rate 85*c*. The name of a volume to which the storage area of the pool 404 corresponding to the row is allocated and the allocation proportion (rate) are stored in the allocation volume name (rate) 85*d*. A threshold (threshold [warning]) for detecting a warning state (an example of an abnormality) for the usage rate of the pool 404 corresponding to the row is stored in the threshold [warning] 85*e*. A threshold (threshold [abnormality]) for detecting an abnormal state for the usage rate of the pool 404 corresponding to the row is stored in the threshold [abnormality] 85*f*. A short-term change rate of the use capacity of the pool 404 corresponding to the row and an interval corresponding to the change rate are stored in the capacity change rate [short-term] (interval) 85*g*. For example, the first row of FIG. 7 indicates that for a pool 404 of pool 01, the usage rate is 50%, 100% of the storage area is allocated to physical volume 01, the threshold [warning] is 80%, the threshold [abnormality] is 95%, and the capacity change rate in 15 minutes (15 min) is 0%.

FIG. 8 is a diagram illustrating a configuration of a drive monitoring table according to an embodiment.

The drive monitoring table 86 is a table for managing the latest operation information of the respective drives 401 in the storage apparatus 30 and stores rows (records) corresponding to the respective drive 401. The row of the drive monitoring table 86 includes the fields of number (#) 86a, drive name 86b, operation rate 86c, threshold [warning] 86d, threshold [abnormality] 86e, and operation rate change rate [short-term] (interval) 86f.

The number of a row in the drive monitoring table 86 is stored in the number (#) 86a. A drive name of the drive 401 corresponding to the row is stored in the drive name 86b. An operation rate (an example of operation information) of the drive 401 corresponding to the row is stored in the operation rate 86c. A threshold (threshold [warning]) for detecting a warning state (an example of abnormality) for the operation rate of the drive 401 corresponding to the row is stored in the threshold [warning] 86d. A threshold (threshold [abnormality]) for detecting an abnormal state for the operation rate of the drive 401 corresponding to the row is stored in the threshold [abnormality] 86e. A short-term change rate of the operation rate of the drive 401 corresponding to the row and an interval corresponding to the change rate are stored in the operation rate change rate [short-term] (interval) 86f. For example, the first row of FIG. 8 indicates that for the drive 401 of drive 01, the operation rate is 20%, the threshold [warning] is 60%, the threshold [abnormality] is 80%, and the operation rate change rate in 15 minutes (15 min) is 0%.

FIG. 9 is a diagram illustrating a configuration of a drive monitoring history table according to an embodiment.

The drive monitoring history table 87 is a table for managing the history of operation information from the past of the respective drives 401 in the storage apparatus 30 and stores rows (records) corresponding to the respective time points of the respective drives 401. The row of the drive monitoring history table 87 includes the fields of number (#) 87a, drive name 87b, time 87c, and operation rate 87d.

The number of a row in the drive monitoring history table 87 is stored in the number (#) 87a. The drive name of the drive 401 corresponding to the row is stored in the drive name 87b. The time indicating a time point corresponding to the row is stored in the time 87c. An operation rate at the time point of the drive 401 corresponding to the row is stored in the operation rate 87d.

FIG. 10 is a diagram illustrating a configuration of a pool monitoring history table according to an embodiment.

The pool monitoring history table 88 is a table for managing the history of the operation information from the past of the respective pools 404 in the storage apparatus 30 and stores rows (records) corresponding to the respective time points of the respective pools 404. The row of the pool monitoring history table 88 includes the fields of number (#) 88a, pool name 88b, time 88c, usage rate 88d, and allocation volume (rate) 88e.

The number of a row in the pool monitoring history table 88 is stored in the number (#) 88a. A pool name of the pool 404 corresponding to the row is stored in the pool name 88b. Time indicating a time point corresponding to the row is stored in the time 88c. A usage rate at the time point of the pool 404 corresponding to the row is stored in the usage rate 88d. The name of a volume to which the storage area of the pool 404 corresponding to the row and an allocation proportion (rate) are stored in the allocation volume (rate) 88e.

FIG. 11 is a diagram illustrating a configuration of a fault table according to an embodiment.

The fault table 89 is a table for managing faults (abnormalities) occurring in the storage apparatus 30 and stores rows (records) corresponding to a fault type and a fault location. The row of the fault table 89 includes the fields of number (#) 89a, fault type 89b, fault location 89c, and concurrent fault 89d.

The number of a row in the fault table 89 is stored in the number (#) 89a. A fault type corresponding to the row is stored in the fault type 98b. In the present embodiment, examples of the fault type include performance deficiency such as low access speed, capacity shortage such as shortage of a storage capacity of the pool 404, and a drive fault such as a fault occurring in a drive. A location (a fault location) in which a fault corresponding to the row is stored in the fault location 89c. Information on one or more faults which can occur simultaneously with a fault indicated by a fault type and a fault location corresponding to the row is stored in the concurrent fault 89d. Here, the fault occurring simultaneously with the fault indicated by the fault type and the fault location is another fault which can occur concurrently with the fault indicated by the fault type and the fault location after the fault occurred. The fault information may include a pair of the number of a row in the fault table 89 corresponding the other fault occurring concurrently and a probability of occurrence of the fault when there are a plurality of fault locations of the fault. In the present embodiment, when other faults occur selectively, the respective pieces of fault information are stored in a state of being associated by "or" in the concurrent fault 89d.

For example, a third row of FIG. 11 indicates that other faults occurring simultaneously with a fault of capacity shortage for the pool 404 of pool 01 include a fault (probability 1/1) on the first row or a fault (probability 1/1) on the second row of the fault table 89, a fault on the fourth row (probability 1/1), a fault on the fifth row (probability 1/16), and a fault on the sixth row (probability 1/16).

FIG. 12 is a diagram illustrating a configuration of a RAID group type table according to an embodiment.

The RAID group type table 90 is a table indicating a list of RAID group configurations creatable in the storage apparatus 30 and stores rows (records) corresponding to respective RAID levels. The row of the RAID group type table 90 includes the fields of number (#) 90a, RAID level 90b, reliability evaluation value 90c, and performance evaluation value 90d.

The number of a row in the RAID group type table 90 is stored in the number 90a. A RAID level corresponding to the row is stored in the RAID level 90b. An evaluation value (a reliability evaluation value) of reliability of a RAID group of the RAID level corresponding to the row is stored in the reliability evaluation value 90c. In the present embodiment, the higher the reliability evaluation value, the higher the reliability of the configuration. An evaluation value (a performance evaluation value) of performance of a RAID group of the RAID level corresponding to the row is stored in the performance evaluation value 90d. In the present embodiment, the higher the performance evaluation value, the higher the performance of the configuration.

FIG. 13 is a diagram illustrating a configuration of a drive type table according to an embodiment.

The drive type table 91 is a table indicating a list of drive types mountable in the storage apparatus 30 and stores rows (records) corresponding to the respective drive types (drive types). The row of the drive type table 91 includes the fields of number (#) 91*a*, drive type (capacity) 91*b*, spare drive type (capacity) 91*c*, performance evaluation value 91*d*, and performance ratio 91*e*.

The number of a row in the drive type table 91 is stored in the number 91*a*. A drive type corresponding to the row and the capacity of the drive are stored in the drive type (capacity) 91*b*. A drive type usable as a spare drive (a data migration destination drive) and the capacity of the drive when a fault occurs in the drive of the drive type corresponding to the row occurs are stored in the spare drive type (capacity) 91*c*. When there are a plurality of drive types usable as the spare drive, a plurality of drive types are stored in the spare drive type (capacity) 91*c*. A performance evaluation value of the drive of a drive type corresponding to the row is stored in the performance evaluation value 91*d*. In the present embodiment, the higher the performance evaluation value, the higher the performance of the drive. A value (that is, a performance ratio) indicating the performance of the drive of the drive type corresponding to the row when the performance of an NL-SAS HDD is 1 is stored in the performance ratio 91*e*.

FIG. 14 is a diagram illustrating a configuration of a tier type table according to an embodiment.

The tier type table 92 is a table indicating a list of tier configurations of the pool 404 that can be formed in the storage apparatus 30 and stores rows (records) corresponding to the respective tier configurations. The row of the tier type table 92 includes the fields of number (#) 92*a*, tier 92*b*, and drive type 92*c*.

The number of a row in the tier type table 92 is stored in the number 92*a*. One or more tier names indicating the tier configuration corresponding to the row are stored in the tier 92*b*. The type of a drive that can form the respective tiers of the tier configuration corresponding to the row is stored in the drive type 92*c*. For example, the eighth row of FIG. 14 indicates that tiers can be formed by Tier 1 and Tier 2, Tier 1 can be formed by SSD, and Tier 2 can be formed by SAS HDD.

FIG. 15 is a diagram illustrating a configuration of a resource introduction history table according to an embodiment.

The resource introduction history table 93 is a table for managing the history of resource introduction for eliminating faults in the storage apparatus 30 and stores rows (records) corresponding to respective resource introductions. The row of the resource introduction history table 93 includes the fields of number (#) 93*a*, introduction time 93*b*, reclamation time 93*c*, fault location 93*d*, fault type 93*e*, and introduced resource 93*f*.

The number of a row in the resource introduction history table 93 is stored in the number 93*a*. The time (for example, year/month/day hh:mm) at which resource introduction corresponding to the row was performed is stored in the introduction time 93*b*. The time at which the resource that performed the resource introduction corresponding to the row was reclaimed is stored in the reclamation time 93*c*. When resources are not reclaimed, the reclamation time 93*c* is blank. A fault location in which resource introduction corresponding to the row was performed is stored in the fault location 93*d*. The type of a fault which is the cause of the resource introduction corresponding to the row is stored in the fault type 93*e*. The resources introduced for the resource introduction corresponding to the row are stored in the introduced resource 93*f*.

For example, the first row of FIG. 15 indicates that, for a fault of performance deficiency of pool 01, resource introduction involving creating RAID group 03 of RAID 5 (5D+1P) using drives 13 to 18, creating physical volume 03 (capacity 500 GB) using the storage area of RAID group 03, and allocating the physical volume 03 so as to be added to Tier 1 of pool 01 was performed 2017/01/01 12:00, and the introduced resources have not been reclaimed.

FIG. 16 is a diagram illustrating a configuration of a page migration performance list table according to an embodiment.

The page migration performance list table 94 is a table for managing the performance (page migration performance) during migration of pages in the storage apparatus 30 and stores rows (records) corresponding to the page migration performance. The row of the page migration performance list table 94 includes the fields of number (#) 94*a*, speed type 94*b*, and speed 94*c*.

The number of a row in the page migration performance list table 94 is stored in the number 94*a*. A speed type corresponding to a page migration performance corresponding to the row is stored in the speed type 94*b*. A transfer speed in the page migration performance corresponding to the row is stored in the speed 94*c*.

FIG. 17 is a diagram illustrating a configuration of a page migration performance influence list table according to an embodiment.

The page migration performance influence list table 95 is a table for managing an increase amount of the load (in this example, an operation rate) when page migration is performed in the storage apparatus 30 and stores rows (records) corresponding to each configuration of a RAID group that performs page migration. The row of the page migration performance influence list table 95 includes the fields of number (#) 95*a*, RAID level 95*b*, drive type 95*c*, and low-speed load [migration destination/source] 95*d*.

The number of a row in the page migration performance influence list table 95 is stored in the number 95*a*. A RAID level of the RAID group corresponding to the row is stored in the RAID level 95*b*. The type of a drive that forms the RAID group corresponding to the row is stored in the drive type 95*c*. An increase amount (an operation rate increase amount) of the load in migration destination/source drives when page migration is performed at a low speed in the configuration of the RAID group corresponding to the row is stored in the low-speed load [migration destination/source] 95*d*.

FIG. 18 is a diagram illustrating a configuration of a resource introduction plan list table according to an embodiment.

The resource introduction plan list table 96 is a table for managing a resource introduction plan calculated to eliminate (solve) abnormalities in the storage apparatus 30 and stores rows (records) corresponding to respective resource introduction plans. The resource introduction plan list table 96 is provided for each target abnormality, for example. The row of the resource introduction plan list table 96 includes the fields of number (#) 96*a*, evaluation value 96*b*, fault # (number) 96*c*, added volume (capacity) 96*d*, added RAID group 96*e*, added drive 96*f*, and configuration change 96*g*.

The number of a row in the resource introduction plan list table 96 is stored in the number 96*a*. An evaluation value for the resource introduction plan corresponding to the row is stored in the evaluation value 96*b*. In the present embodiment, if the resource introduction plan is a plan to add a physical volume in the event of a fault related to a physical volume, for example, the evaluation value 96*b* is set to "1" when a reliability evaluation value of the added physical volume is equal to that of a physical volume associated with the fault and a performance evaluation value is equal to or larger than that of the faulty physical volume. The evaluation value 96b is set to "2" when the reliability evaluation value is equal to that of the faulty physical volume and the performance evaluation value is smaller than that of the faulty physical volume. In the present embodiment, the smaller the evaluation value set in the evaluation value 96b, the higher the evaluation of the resource introduction plan. The number (the number of a row in the fault table 89 corresponding to the fault type) corresponding to the fault type solved by the resource introduction plan corresponding to the row is stored in the fault # (number) 96c. A volume name of a volume added by the resource introduction plan corresponding to the row and an added capacity are stored in the added volume (capacity) 96d. A RAID level of a RAID group added by the resource introduction plan corresponding to the row is stored in the added RAID group 96e. The type and the number of drives added by the resource introduction plan corresponding to the row are stored in the added drive 96f. The content of a configuration changed by the resource introduction plan corresponding to the row is stored in the configuration change 96g.

Figure 19:
FIG. 19 is a diagram illustrating a configuration of a configuration change time list table according to an embodiment.

FIG. 19 is a diagram illustrating a configuration of a configuration change time list table according to an embodiment.

The configuration change time list table 97 is a table for managing the time necessary when the configuration is changed in the storage apparatus 30 and stores rows (records) corresponding to each content of the configuration change. The row of the configuration change time list table 97 includes the fields of number (#) 97a, configuration change 97b, and time 97c.

The number of a row in the configuration change time list table 97 is stored in the number 97a. The content of configuration change corresponding to the row is stored in the configuration change 97b. Time (minute (min)) necessary for configuration change corresponding to the row is stored in the time 97c.

FIG. 20 is a diagram illustrating a configuration of a configuration change means list table according to an embodiment.

The configuration change means list table 98 is a table for managing configuration change means in the storage apparatus 30 and stores rows (records) corresponding to each configuration change means. The row of the configuration change means list table 98 includes the fields of number (#) 98a, fault type 98b, means 98c, and configuration change 98d.

The number of a row in the configuration change means list table 98 is stored in the number 98a. A fault type solved by the configuration change means corresponding to the row is stored in the fault type 98b. The means corresponding to the row is stored in the means 98c. The content of configuration change by the configuration change means corresponding to the row is stored in the configuration change 98b.

Next, a processing operation of the storage apparatus 30 according to an embodiment will be described.

Figure 21:
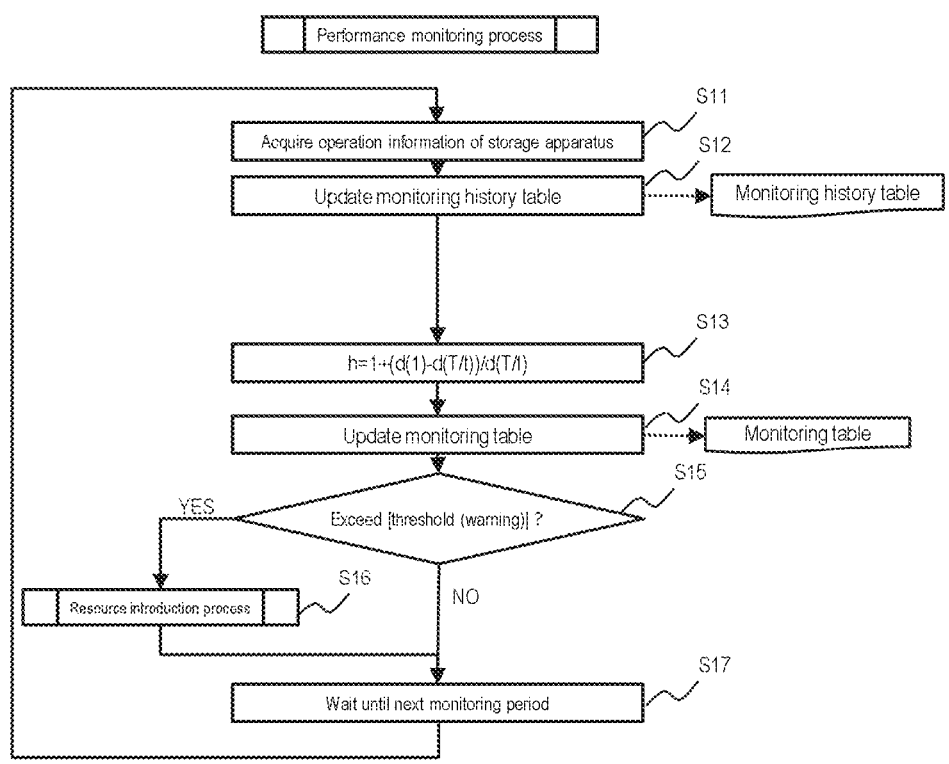
FIG. 21 is a flowchart of a performance monitoring process according to an embodiment.

FIG. 21 is a flowchart of a performance monitoring process according to an embodiment.

The performance monitoring process is performed when the processor 53 executes the performance monitoring process program 62. The performance monitoring process starts being executed after the power of the storage apparatus 30 is turned on and is executed continuously.

First, the processor 53 acquires the operation information (the operation rate of each drive 404 and the usage rate of each pool 404) of the storage apparatus 30 (step S11).

Subsequently, the processor 53 updates a monitoring history table (the drive monitoring history table 87 and the pool monitoring history table 88) on the basis of the acquired operation rate and usage rate (step S12).

Subsequently, the processor 53 calculates a change rate [short-term] h (capacity change rate [short-term] and operation rate change rate [short-term]) of the operation information according to Equation (1) below (step S13).

$$h=1+(d(1)-d(T/t))/d(T/t) \quad (1)$$

Here, T is the period (interval) of calculating the change rate [short-term] and t is an acquisition interval of the operation information. d(n) indicates the operation information at time point n, n=1 indicates a latest time point at which the operation information was acquired, n=2, 3, . . . indicate the time points, one period, two periods, . . . before the operation information was acquired. Therefore, d(T/t) indicates the operation information at the time point, one period before the calculation period of the change rate [short-term].

Subsequently, the processor 53 updates a monitoring table (the pool monitoring table 85 and the drive monitoring table 86) on the basis of the operation information acquired instep S11 and the change rate [short-term] (the capacity change rate [short-term] and the operation rate change rate [short-term]) calculated in step S13 (step S14). Specifically, the processor 53 updates the value of the usage rate 85c in the row corresponding to each pool in the pool monitoring table 85 to the usage rate acquired in step S11 and updates the value of the capacity change rate [short-term] (interval) 85g to the capacity change rate [short-term] and the interval calculated in step S13. Moreover, the processor 53 updates the value of the operation rate 86c in the row corresponding to each drive in the drive monitoring table 86 to the operation rate acquired in step S11 and updates the value of the operation rate change rate [short-term] (interval) 86f to the operation rate change rate [short-term] and the interval calculated in step S13.

Subsequently, the processor 53 performs the process of step S15 with respect to the respective rows of the pool monitoring table 85 and the drive monitoring table 86. First, the processor 53 determines whether the operation information (the usage rate or the operation rate) of a target record exceeds the value of the threshold [warning] of the row (step S15). When the operation information exceeds the threshold [warning] (step S15: YES), since it means that an abnormality has occurred, the processor 53 executes a resource introduction process (step S16: see FIG. 23) of introducing resources to solve the abnormalities. When the operation information does not exceed the threshold [warning] (step S15: NO), the processor 53 does perform anything.

After performing the processes subsequent to step S15 with respect to the respective rows of the pool monitoring table 85 and the drive monitoring table 86, the processor 53 stops processing until the next monitoring period (step S17) and then the flow proceeds to step S11.

Figure 22:
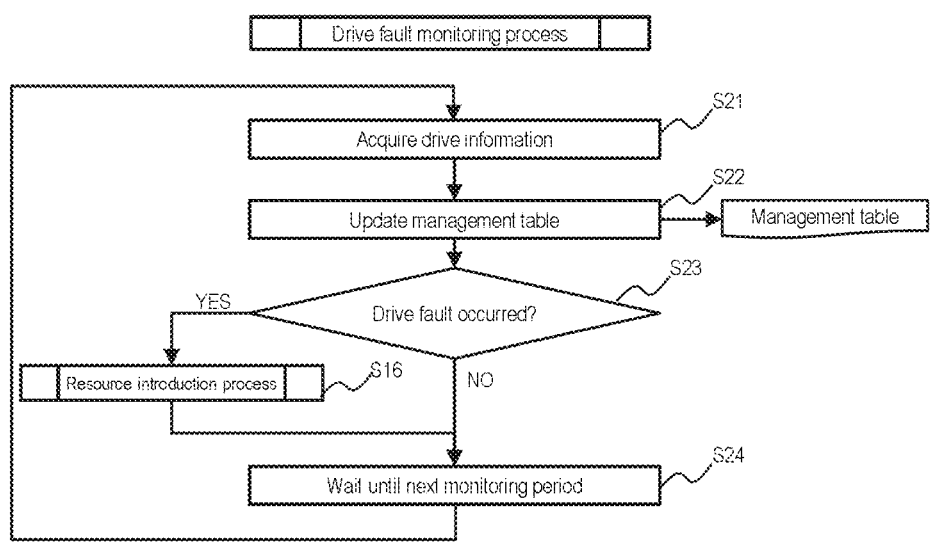
FIG. 22 is a flowchart of a drive fault monitoring process according to an embodiment.

FIG. 22 is a flowchart of a drive fault monitoring process according to an embodiment.

The drive fault monitoring process is performed when the processor 53 executes the drive fault monitoring process program 63. The drive fault monitoring process starts being executed after the power of the storage apparatus 30 is turned on, for example, and is executed continuously.

First, the processor 53 acquires information (drive information) on the state of each drive 401 of the storage apparatus 30 (step S21). Here, the drive information is information indicating a state (NORMAL) in which the drive 401 operates normally or a state (ERROR) in which a fault has occurred, for example.

Subsequently, the processor 53 updates the drive management table 84 on the basis of the acquired drive information (step S22). Specifically, the processor 53 updates the value of the state 84e of the row of each drive 401 of the drive management table 84 to the acquired value of the drive information of each drive 401.

Subsequently, the processor 53 performs the process of step S23 with respect to respective rows of the drive management table 84. First, the processor 53 determines whether a drive fault has occurred in the drive corresponding to the row (step S23). Specifically, the processor 53 determines whether a drive fault has occurred in the drive 401 on the basis of whether the row state 84e is ERROR.

As a result, when the drive fault has occurred (step S23: YES), the processor executes a resource introduction process (step S16: see FIG. 23) of introducing resources to solve the drive fault. When the drive fault has not occurred (step S23: NO), the processor does not perform anything.

After performing the processes up to step S23 with respect to the respective rows of the drive management table 84, the processor 53 stops processing until the next monitoring period (step S24) and then the flow proceeds to step S21.

Figure 23:
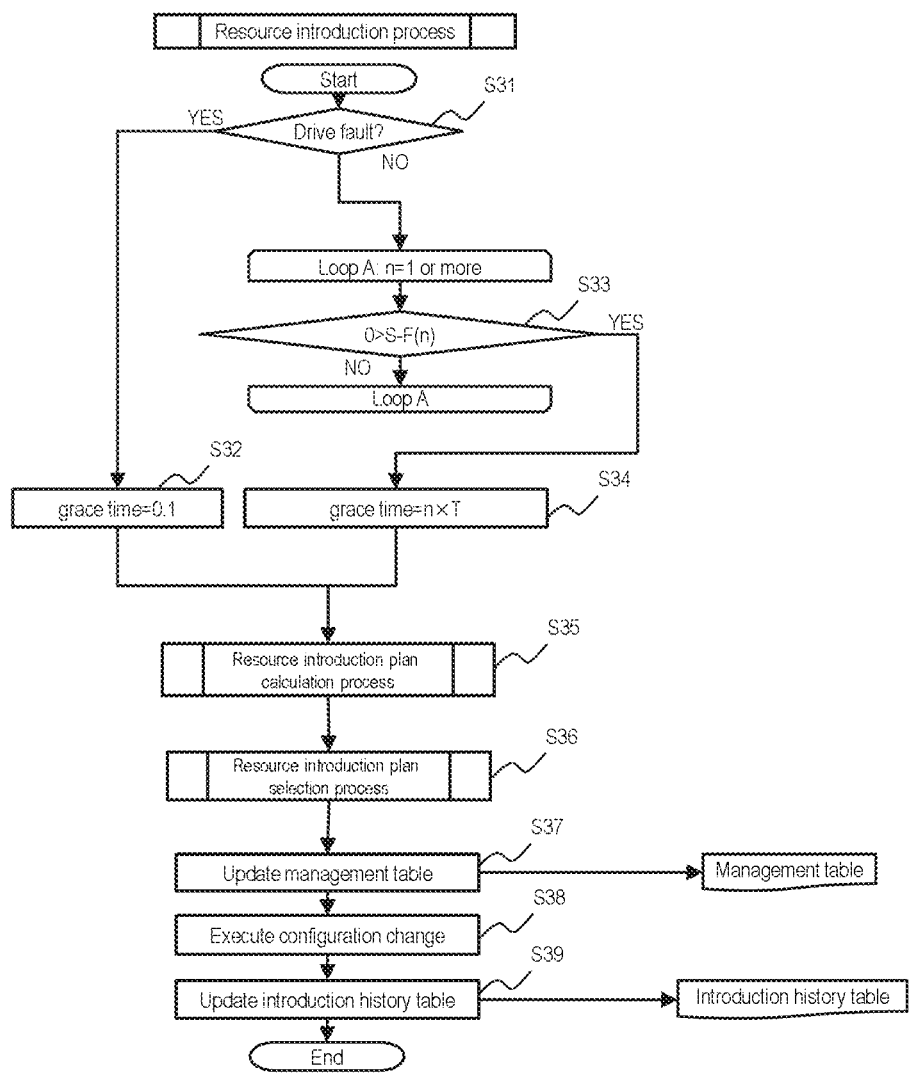
FIG. 23 is a flowchart of a resource introduction process according to an embodiment.

FIG. 23 is a flowchart of a resource introduction process according to an embodiment.

The resource introduction process is performed when the processor 53 executes the resource introduction process program 68. The resource introduction process is a process executed in step S16 of the performance monitoring process in FIG. 21 and the drive fault monitoring process in FIG. 22.

The processor 53 determines whether the fault is a drive fault (a fault in hardware of the drive 401) (step S31). Here, when the resource introduction process is executed in the drive fault monitoring process, it is determined that the fault is a drive fault.

As a result, when the fault is a drive fault (step S31: YES), the processor 53 sets a grace time required for coping with the fault as a predetermined time (in the present embodiment, for example, 0.1 (min)) in the event of a drive fault (step S32) and starts executing a resource introduction plan calculation process (step S35: see FIG. 24) of calculating the resource introduction plan for coping with the fault.

On the other hand, when the fault is not a drive fault (step S31: NO), the processor 53 executes the process of loop A (step S33). In loop A, the value of variable n is increased by 1 from 1, and the process of step S33 is executed for respective variables.

Specifically, the processor 53 determines whether $0 > S - F(n)$ is satisfied (step S33).

Here, S is a threshold [abnormality] of a resource in which a fault has occurred. For example, when a process is related to a fault in the pool 404, S is the value of the threshold [abnormality] 85f in the row of the pool 404 in which a fault is detected in the pool monitoring table 85. For example, when a process is related to a fault (a fault in an operation rate) in the drive 401, S is the value of the threshold [abnormality] 86e in the row of the drive 401 in which a fault is detected in the drive monitoring table 86. $F(n) = d(1) \times h^n$. For example, $F(1) = d(1) \times h$, $F(2) = d(1) \times h \times h$, and $F(3) = d(1) \times h \times h \times h$. $F(n)$ indicates an estimated value of the operation information after n periods (period is a computation period of change rate [short-term]).

Therefore, the determination on whether $0 > S - F(n)$ is satisfied means determination on whether the value of the operation information after n periods exceeds the value of the threshold [abnormality].

As a result, when $0 > S - F(n)$ is satisfied (step S33: YES), since it means that the operation information exceeds the value of the threshold [abnormality], the processor 53 exits loop A and the flow proceeds to step S34. On the other hand, when $0 > S - F(n)$ is not satisfied (step S33: NO), since it means that the operation information does not exceed the threshold [abnormality], the processor 53 continues executing the process of loop A. According to the process of loop A, it is possible to detect the period required for the operation information to exceed the threshold [abnormality] appropriately.

In step S34, the processor 53 sets n×T as a grace time and then starts executing the resource introduction plan calculation process (step S35: see FIG. 24) of calculating the resource introduction plan for coping with the fault.

After finishing the resource introduction plan calculation process, the processor 53 starts executing the resource introduction plan selection process (step S36: see FIG. 26) of selecting the resource introduction plan to be executed actually from the resource introduction plans calculated in step S35.

After finishing the resource introduction plan selection process, the processor 53 updates a management table (at least one table among the pool management table 81, the RAID group management table 82, the volume management table 83, and the drive management table 84) so that the configuration change of the storage apparatus 30 according to the selected resource introduction plan is applied (step S37) and performs the configuration change of the selected resource introduction plan (step S38). After that, the processor 53 performs updating to add a row corresponding to the resource introduction plan performed to the resource introduction history table 93 (step S39) and ends the resource introduction process.

Figure 24:
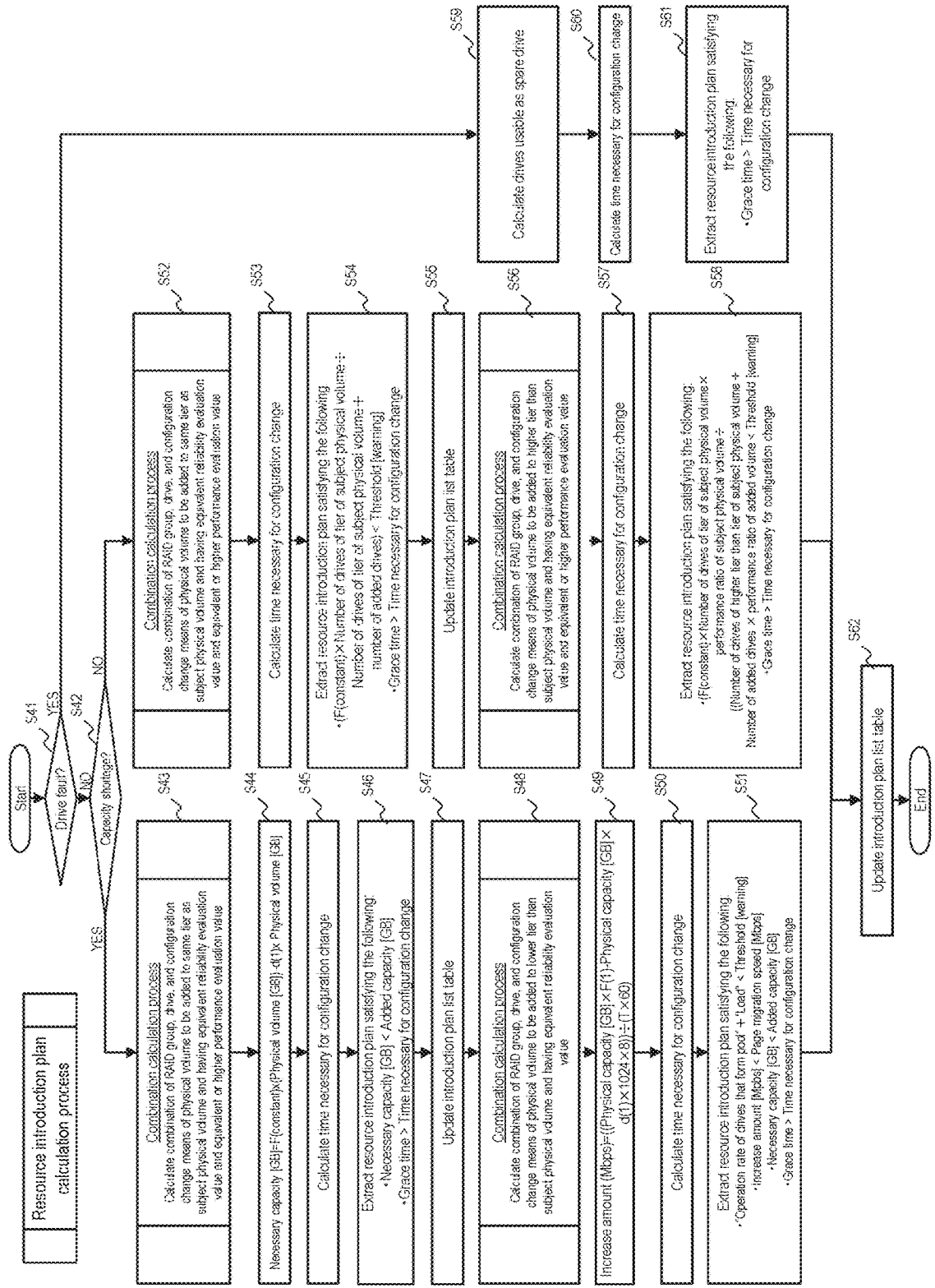
FIG. 24 is a flowchart of a resource introduction plan calculation process according to an embodiment.

FIG. 24 is a flowchart of the resource introduction plan calculation process according to an embodiment.

The resource introduction plan calculation process is performed when the processor 53 executes the introduction plan calculation process program 70. The resource introduction plan calculation process is a process executed in step S35 of the resource introduction process in FIG. 23.

The processor 53 determines whether the fault is a drive fault (step S41).

As a result, when the fault is not a drive fault (step S41: NO), the processor 53 determines whether the fault type is capacity shortage (step S42).

As a result, when the fault type is a capacity shortage (step S42: YES), the processor 53 executes a combination calculation process (step S43: see FIG. 25) for calculating a combination of RAID group, drive, and configuration change means of pool volumes addable to the same tier as a physical volume where a fault has occurred (hereinafter referred to as a subject physical volume in the description of this process) and having an equivalent reliability evaluation value and an equivalent or higher performance evaluation value.

After executing the combination calculation process, the processor 53 calculates a capacity necessary for the added physical volume (step S44). Specifically, the processor 53 calculates the necessary capacity by Equation (2) below.

$$\text{Necessary capacity [GB]} = F(x) \times \text{physical capacity} \\ \text{[GB]} - d(1) \times \text{physical capacity [GB]} \quad (2)$$

Here, x is a predetermined constant, and the value of x may be increased when it is necessary to provide a capacity margin, for example.

Subsequently, the processor 53 calculates the time necessary for realizing configuration change of the respective combinations calculated in step S43 by referring to the configuration change time list table 97 (step S45).

Subsequently, the processor 53 extracts a combination in which the added capacity [GB] is larger than a necessary capacity [GB] and the time necessary for realizing configuration change is smaller than the grace time among the respective combinations calculated in step S43 as a resource introduction plan (step S46), creates a new resource introduction plan list table 96, and adds a row corresponding to the extracted resource introduction plan to the resource introduction plan list table 96 (step S47).

Subsequently, the processor 53 executes a combination calculation process (step S48: see FIG. 25) for calculating a combination of RAID group, drive, and configuration change means of physical volumes addable to a lower tier than the subject physical volume and having an equivalent reliability evaluation value.

After executing the combination calculation process, the processor 53 calculates an increase amount of the communication amount associated with page migration from the subject physical volume to the added physical volume (step S49). Specifically, the processor 53 calculates the increase amount according to Equation (3) below.

$$\text{Increase amount [Mbps]}=((\text{Physical capacity [GB]}\times F(1)-\text{physical capacity [GB]}\times d(1))\times 1024\times 8)\div(T\times 60) \quad (3)$$

Subsequently, the processor 53 calculates the time necessary for realizing configuration change of the respective combinations calculated in step S48 by referring to the configuration change time list table 97 (step S50).

Subsequently, the processor 53 extracts a combination in which a value obtained by adding the operation rate of the drive that forms a pool (an added physical volume) and the load during page migration acquired from the page migration performance influence list table 95 is smaller than the threshold [warning], the increase amount [Mbps] is smaller than the page migration speed (the value of the speed 94c of the row in the page migration performance list table 94), the added capacity [GB] is larger than the necessary capacity [GB], and the time necessary for realizing configuration change is smaller than the grace time among the combinations calculated in step S48 as a resource introduction plan (step S51) and the flow proceeds to step S62.

On the other hand, when it is determined in step S42 that the fault type is not a capacity shortage (step S42: NO), since it indicates that the fault type is a performance deficiency, the processor 53 executes a combination calculation process (step S52: see FIG. 25) for calculating a combination of RAID group, drive, and configuration change means of physical volumes addable to the same tier as the subject physical volume and having an equivalent reliability evaluation value and an equivalent or higher performance evaluation value.

After executing the combination calculation process, the processor 53 calculates the time necessary for realizing configuration change of the respective combinations calculated in step S52 by referring to the configuration change time list table 97 (step S53).

Subsequently, the processor 53 extracts a combination in which an operation rate (an estimated operation rate) expected when a drive is added to the same tier as the subject physical volume is smaller than the threshold [warning] and the time necessary for realizing configuration change is smaller than the grace time among the respective combinations calculated in step S52 as a resource introduction plan (step S54).

Here, the estimated operation rate can be calculated according to Equation (4) below, for example.

$$\text{Estimated operation rate}=(F(x)\times\text{number of drives on tier to which subject physical volume belongs})\div(\text{number of drives of tier to which subject physical volume belongs}+\text{number of drives added in combination}) \quad (4)$$

Subsequently, the processor 53 creates a new resource introduction plan list table 96 and adds a row corresponding to the resource introduction plan extracted in step S54 to the resource introduction plan list table 96 (step S55).

Subsequently, the processor 53 executes a combination calculation process (step S56: see FIG. 25) for calculating a combination of RAID group, drive, and configuration change means of physical volumes addable to a higher tier than the subject physical volume and having an equivalent reliability evaluation value and an equivalent or higher performance evaluation value.

Subsequently, the processor 53 calculates the time necessary for realizing configuration change of the respective combinations calculated in step S56 by referring to the configuration change time list table 97 (step S57).

Subsequently, the processor 53 extracts a combination in which an operation rate (a higher-tier estimated operation rate) expected when a drive is added to a higher tier than the subject physical volume is smaller than the threshold [warning] and the time necessary for realizing configuration change is smaller than the grace time among the respective combinations calculated in step S56 as a resource introduction plan (step S58) and the flow proceeds to step S62. Here, the higher-tier estimated operation rate can be calculated according to Equation (5) below, for example.

$$\text{Higher-Tier estimated operation rate}=(F(x)\times\text{number of drives on tier to which subject physical volume belongs}\times\text{performance ratio of drive of subject physical volume})\div((\text{number of drives on higher tier than tier to which subject physical volume belongs}+\text{number of drives added in combination})\times\text{performance ratio of drive of added physical volume}) \quad (5)$$

The performance ratio of a drive of the physical volume can be acquired from the value of the performance ratio 91e of the row corresponding to the drive in the drive type table 91.

On the other hand, when it is determined in step S41 that the fault is a drive fault (step S41: YES), the processor 53 calculates one or more drives (corresponding to a resource introduction plan) usable as a spare drive of the drive where the fault occurred (step S59), calculates the time necessary for realizing configuration change for replacing the faulty drive with a spare drive (step S60), and extracts a resource introduction plan in which the time necessary for realizing configuration change is smaller than the grace time (step S61), and the flow proceeds to step S62.

In step S62, the processor 53 adds a row corresponding to the resource introduction plan extracted in the previous step (step S51, S58, or S61) to the resource introduction plan list table 96. When the flow has passed through step S61, the processor 53 creates a new resource introduction plan list table 96.

According to this resource introduction plan calculation process, a row corresponding to a resource introduction plan (a plurality of resource introduction plans if there are a plurality of plans) applicable for solving the fault is stored in the resource introduction plan list table 96.

Figure 25:
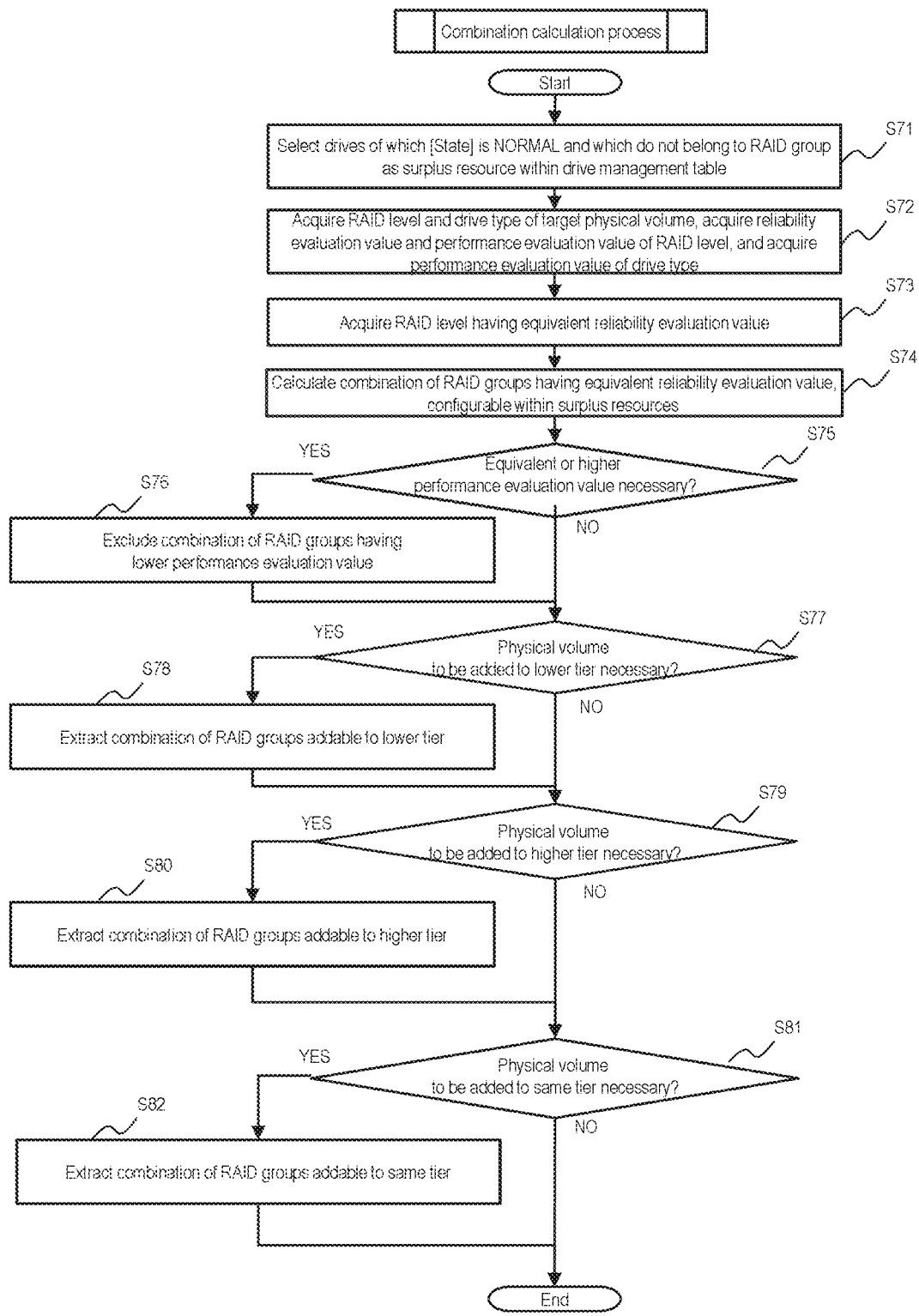
FIG. 25 is a flowchart of a combination calculation process according to an embodiment.

FIG. 25 is a flowchart of the combination calculation process according to an embodiment.

The combination calculation process is performed when the processor 53 executes the combination calculation process program 71. This combination calculation process is the process executed in steps S43, S48, S52, and S56 of the resource introduction plan calculation process in FIG. 24.

The processor 53 specifies a drive 401 which corresponds to a row in which the value of the state 84e in the drive management table 84 is NORMAL and which does not belong to the RAID group and selects this drive 401 as a surplus resource (step S71). Whether the drive 401 belongs to the RAID group can be specified on the basis of whether a drive name is set as the drive name 82c of each row of the RAID group management table 82.

Subsequently, the processor 53 acquires the RAID level and the drive type of the subject physical volume (the subject physical volume in the resource introduction plan calculation process in which the combination calculation process was executed) by referring to the RAID group management table 82, the volume management table 83, and the drive management table 84. Moreover, the processor 53 acquires the reliability evaluation value and the performance evaluation value of the acquired RAID level by referring to the RAID group type table 90. Moreover, the processor 53 acquires the performance evaluation value of the drive of the acquired drive type by referring to the drive type table 91 (step S72).

Subsequently, the processor 53 acquires a RAID level (an equivalent-reliability RAID level) having a reliability evaluation value equivalent to the acquired reliability evaluation value of the RAID level by referring to the RAID group type table 90 (step S73).

Subsequently, the processor 53 calculates a combination of RAID groups of the equivalent-reliability RAID level configurable by the selected surplus resource (step S74).

Here, when the RAID levels having an equivalent reliability evaluation value include RAID5(2D+1P) and RAID5(3D+1P) and the surplus resource includes eight SSDs and three SASs, the following nine combinations are calculated, for example.

SSD:RAID5(2D+1P)×1
SSD:RAID5(3D+1P)×1
SAS:RAID5(2D+1P)×1
SSD:RAID5(2D+1P)×2
SSD:RAID5(3D+1P)×2
SSD:RAID5(2D+1P)×1, SSD:RAID5(3D+1P)×1
SSD:RAID5(2D+1P)×2, SAS:RAID5(2D+1P)×1
SSD:RAID5(3D+1P)×2, SAS:RAID5(2D+1P)×1
SSD:RAID5(2D+1P)×1, SSD:RAID5(3D+1P)×1, SAS:RAID5(2D+1P)×1

Subsequently, the processor 53 determines whether the calculated combination of RAID groups requires an equivalent or higher performance evaluation value (step S75). Whether an equivalent or higher performance evaluation value is required can be determined on the basis of a calculation target combination of the combination calculation process in the resource introduction plan calculation process. For example, in the combination calculation process of step S43, it is determined that an equivalent or higher performance evaluation value is required.

As a result, when the calculated combination of RAID groups requires an equivalent or higher performance evaluation value (step S75: YES), the processor 53 removes a combination including a RAID group having a lower performance evaluation value from the combinations calculated in step S74 (step S76) and the flow proceeds to step S77. When the calculated combination of RAID groups does not require an equivalent or higher performance evaluation value (step S75: NO), the flow proceeds to step S77.

In step S77, the processor 53 determines whether the calculated combination of RAID groups requires a physical volume to be added to a lower tier. Whether the physical volume to be added to a lower tier is necessary can be determined on the basis of a calculation target combination of the combination calculation process in the resource introduction plan calculation process.

As a result, when the calculated combination of RAID groups requires a physical volume to be added to a lower tier (step S77: YES), the processor 53 extracts a combination of RAID groups addable to the lower tier among the present combinations (the combinations calculated in step S74 or the combinations after execution of step S76 if step S76 was executed) (step S78) and the flow proceeds to step S79. When the calculated combination of RAID groups does not require a physical volume to be added to the lower tier (step S77: NO), the flow proceeds to step S79.

In step S79, the processor 53 determines whether the calculated combination of RAID groups requires a physical volume to be added to a higher tier. Whether the physical volume to be added to the higher tier is required can be determined on the basis of the calculation target combination of the combination calculation process in the resource introduction plan calculation process.

As a result, when the calculated combination of RAID groups requires the physical volume to be added to a higher tier (step S79: YES), the processor 53 extracts a combination of RAID groups addable to the higher tier among the present combinations (the combinations calculated in step S74 or the combinations after execution of step S76 if step S76 was executed) (step S80) and the flow proceeds to step S81. When the calculated combination of RAID groups does not require a physical volume to be added to the higher tier (step S79: NO), the flow proceeds to step S81.

In step S81, the processor 53 determines whether the calculated combination of RAID groups requires a physical volume to be added to the same tier. Whether the physical volume to be added to the same tier is required can be determined on the basis of the calculation target combination of the combination calculation process in the resource introduction plan calculation process.

As a result, when the calculated combination of RAID groups requires the physical volume to be added to the same tier (step S81: YES), the processor 53 extracts a combination of RAID groups addable to the same tier among the present combinations (the combinations calculated in step S74 or the combinations after execution of step S76 if step S76 was executed) (step S82) and returns the extracted combination of RAID groups to the combination calculation process, and the process ends. When the calculated combination of RAID groups does not require a physical volume to be added to the same tier (step S81: NO), the processor 53 returns the extracted combination of RAID groups to the combination calculation process, and the process ends.

Figure 26:
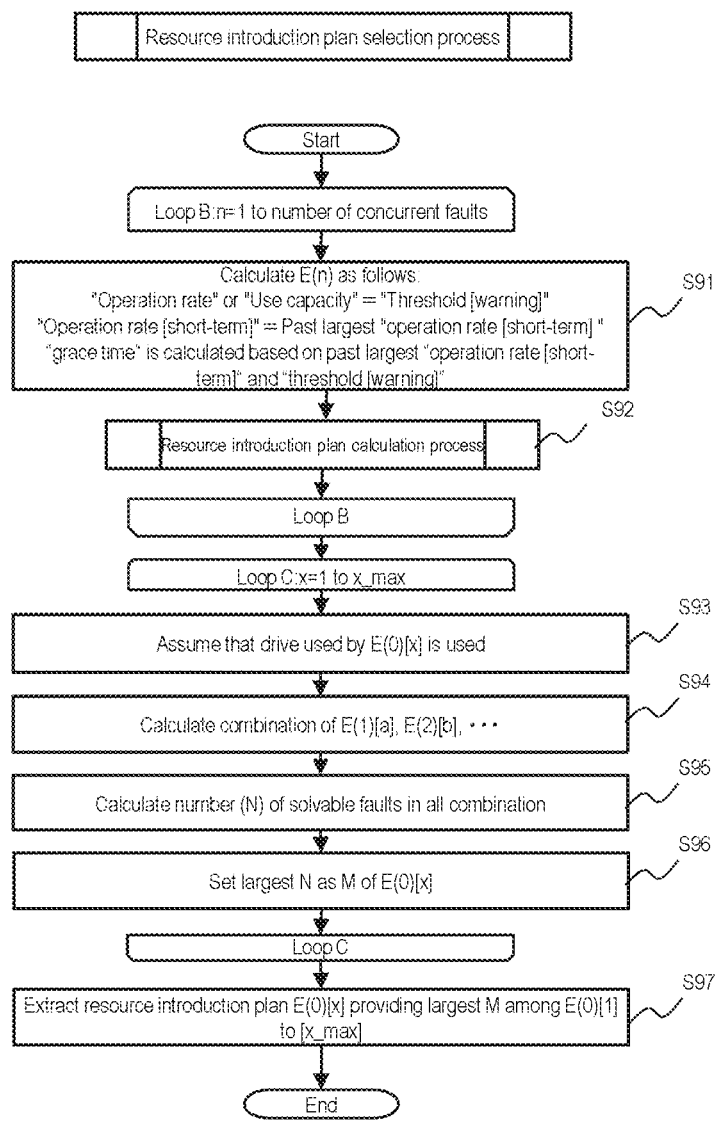
FIG. 26 is a flowchart of a resource introduction plan selection process according to an embodiment.

FIG. 26 is a flowchart of a resource introduction plan selection process according to an embodiment.

The resource introduction plan selection process is performed when the processor 53 executes the resource introduction plan selection process program 72. The resource introduction plan selection process is a process executed in step S36 of the resource introduction process in FIG. 23.

The processor 53 executes the process (steps S91 and S92) of loop B. In loop B, the value of variable n is increased by 1 from 1 to the number of faults that are likely to occur simultaneously and the processes of steps S91 and S92 are executed using the values of the respective variables n.

In loop B, first, the processor 53 sets a value to be used for calculating E(n) (step S91). Here, E(n) is the resource introduction plan list table 96 corresponding to the n-th fault occurring concurrently with a fault (occurring fault) occurring presently. n is represented by n=CEIL(k(1)×c(1))+CEIL(k(2)×c(2))+ . . . +CEIL(k(i)×c(i)) where i is the order of registration in the concurrent fault 89d of the row corresponding to the occurring fault in the fault table 89, k(i) is the probability of i, and c(i) is the number of fault locations of i. CEIL is a function of truncating a fractional part. The number N of faults occurring concurrently with a fault (occurring fault) occurring presently is represented by N=CEIL(k(1)×c(1))+CEIL(k(2)×c(2))+ . . . +CEIL(k(I)×c(I)) where I is the number of faults registered in the concurrent fault 89d in the row corresponding to the occurring fault in the fault table 89.

As values used for calculating E(n), an operation rate or a use capacity is set to a threshold [warning] corresponding thereto, a change rate [short-term] is set to a largest change rate [short-term] measured in the past, and a grace time is set to a value calculated on the basis of the past largest change rate [short-term] and the threshold [warning].

Subsequently, the processor 53 executes the resource introduction plan calculation process (see FIG. 24) using the values set in step S91 (step S92). According to the process of step S92, the resource introduction plan list table 96 including the resource introduction plan when a fault that are likely to occur simultaneously with an occurring fault occurred is created.

When steps S91 and S92 were performed using the number of concurrent faults as the variable n, the processor 53 exits loop B.

Subsequently, the processor 53 executes the process (steps S93 to S96) of loop C. In loop C, the value of variable x is increased by 1 from 1 to x_max and the processes of steps S93 to S96 are executed using the values of variables x. Here, x_max is the largest value of the number of the row of the resource introduction plan list table 96 corresponding to the occurring fault.

In loop C, the processor 53 assumes that the drive 401 used in E(0)[x] was used for the set variable x (step S93). Here, E(0) indicates the resource introduction plan list table 96 corresponding to the occurring fault, and E(0)[x] indicates the x-th row of the resource introduction plan list table 96 corresponding to the occurring fault.

Subsequently, the processor 53 calculates combinations (E(1)[a], E(2)[b], . . . ) of resource introduction plans for all faults that are likely to occur concurrently with the occurring fault (step S94).

For example, when E(1)[1], E(1)[2], E(2)[1], E(2)[2], E(3)[1], E(3)[2] are present as a resource introduction plan for other faults occurring concurrently with the occurring fault, and a fault corresponding to E(2) does not occur concurrently with a fault corresponding to E(3), the following sixteen combinations are calculated in step S94. The order of the respective resource introduction plans indicates an execution order.

E(1)[1] , E(2)[1]
E(1)[1], E(2)[2]
E(1)[1], E(3)[1]
E(1)[1], E(3)[2]
E(1)[2], E(2)[1]
E(1)[2], E(2)[2]
E(1)[2], E(3)[1]
E(1)[2], E(3)[2]
E(2)[1], E(1)[1]
E(2)[2], E(1)[1]
E(3)[1], E(1)[1]
E(3)[2], E(1)[1]
E(2)[1], E(1)[2]
E(2)[2], E(1)[2]
E(3)[1], E(1)[2]
E(3)[2], E(1)[2]

Subsequently, the processor 53 calculates the number (N) of faults solvable using usable drives in all calculated combinations (step S95).

Subsequently, the processor 53 set the largest value among the calculated N as M of E(0)[x] (step S96). Here, M means the largest number of solvable faults that are likely to occur simultaneously. M is an example of a state in which other abnormalities that are likely to occur concurrently with the abnormality can be coped with.

Here, it is assumed that the following six combinations are calculated in step S94, for example.
E(1)[1], E(2)[1], E(3)[1]
E(1)[1], E(3)[1], E(2)[1]
E(2)[1], E(1)[1], E(3)[1]
E(2)[1], E(3)[1], E(1)[1]
E(3)[1], E(1)[1], E(2)[1]
E(3)[1], E(2)[1], E(1)[1]

In this case, it is assumed that E(1)[1] uses eight SSDs, E(2)[1] uses four SSDs, E(3)[1] uses four SSDs, and the surplus resource includes eight SSDs.

In this case, in step S95, N=1 is calculated for E(1)[1], E(2)[1], and E(3)[1], N=1 is calculated for E(1)[1], E(3)[1], and E(2)[1], N=1 is calculated for E(2)[1], E(1)[1], and E(3)[1], N=2 is calculated for E(2)[1], E(3)[1], and E(1)[1], N=1 is calculated for E(3)[1], E(1)[1], and E(2)[1], and N=2 is calculated for E(3)[1], E(2)[1], and E(1)[1]. Moreover, M of E(0)[x] is calculated as 2 in step S96.

In loop C, when the processes of steps S93 to S96 end using variable x as x_max, the processor 53 exits loop C.

Subsequently, the processor 53 extracts (determines) the resource introduction plan E(0)[x] which provides the largest M among E(0)[1] to [x_max] as a resource introduction plan to be executed (step S97) and the process ends.

According to the resource introduction plan selection process, it is possible to determine a resource introduction plan that leaves resources capable of coping with a larger number of faults that are likely to occur concurrently with an occurring fault appropriately, as a resource introduction plan used to eliminate an occurring fault. In this way, it is possible to increase the possibility to cope with a fault occurring newly when resources were introduced to eliminate an occurring fault.

Figure 27:
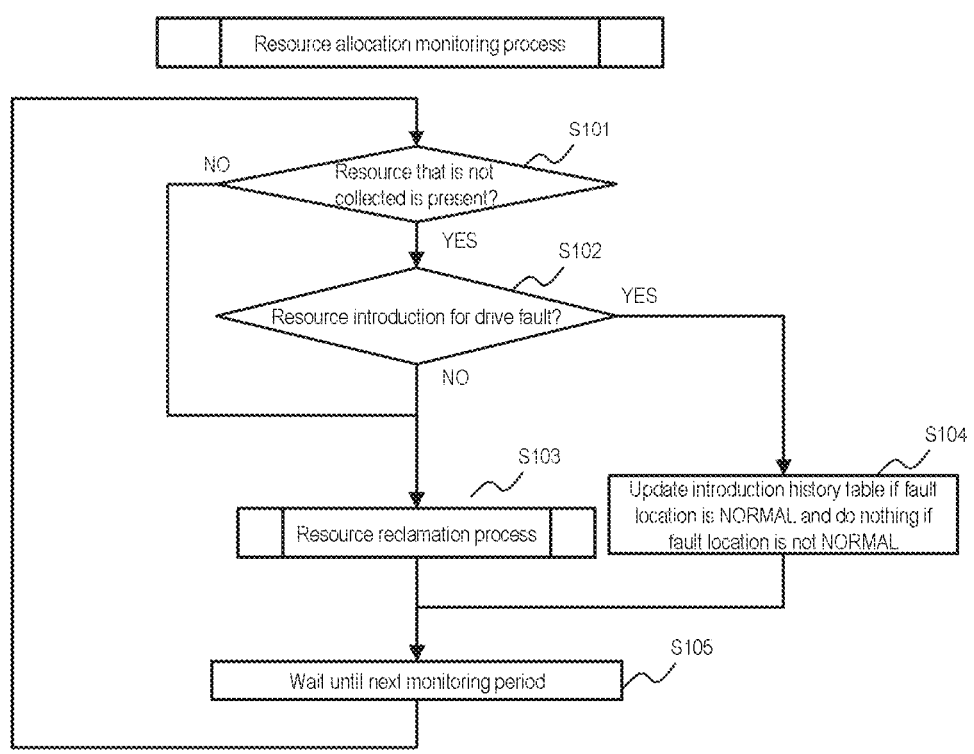
FIG. 27 is a flowchart of a resource allocation monitoring process according to an embodiment.

FIG. 27 is a flowchart of a resource allocation monitoring process according to an embodiment.

The resource allocation monitoring process is performed when the processor 53 executes the resource allocation monitoring process program 64. The resource allocation monitoring process starts being executed after the power of the storage apparatus 30 is turned on, for example, and is executed continuously.

First, the processor 53 determines whether there is a resource that is not reclaimed by referring to the resource introduction history table 93 (step S101). Here, whether a resource is reclaimed can be determined on the basis of whether a row in which a value is not set to the reclamation time 93c is present in the resource introduction history table 93.

As a result, when it is determined that there is not a resource that is not reclaimed (step S101: NO), the processor 53 proceeds to step S103.

On the other hand, when it is determined that there is a resource that is not reclaimed (step S101: YES), the processor 53 determines whether the resource that is not reclaimed is a resource for a drive fault (step S102).

As a result, when the resource is not a resource for a drive fault (step S102: NO), the processor 53 executes a resource reclamation process (step S103: see FIG. 28) for reclaiming the corresponding resource and the flow proceeds to step S105.

On the other hand, when the resource is a resource for a drive fault (step S102: YES), the processor 53 sets the present time to the reclamation time 93c of the row corresponding to the fault location of the resource introduction history table 93 when a drive in the fault location is NORMAL (that is, the state 84e of the row corresponding to the drive in the fault location of the drive management table 84 is NORMAL) and does not perform anything (step S104) when the row state 84e is not NORMAL, and the flow proceeds to step S105.

In step S105, the processor 53 stops the process until the next monitoring period and the flow proceeds to step S101.

Figure 28:
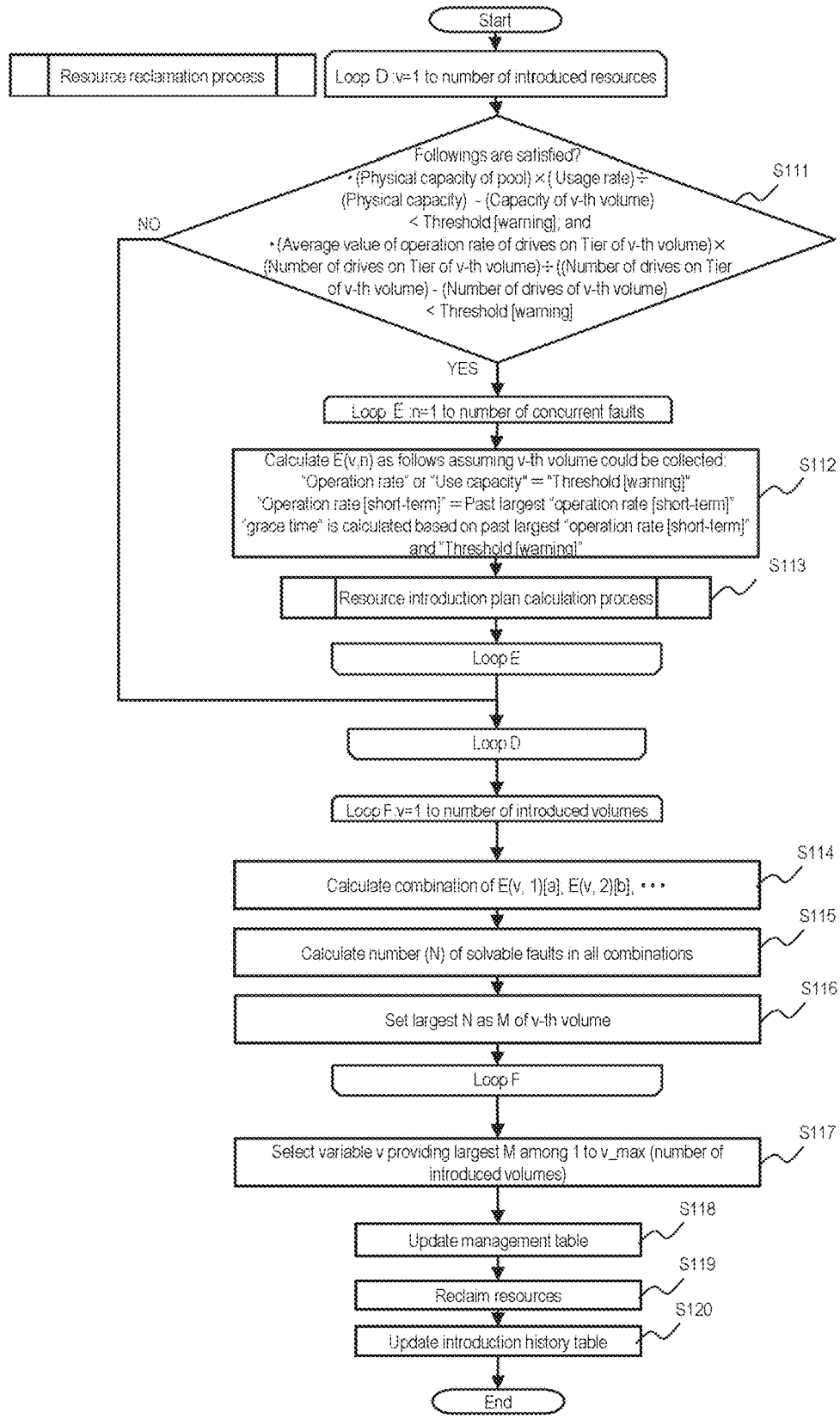
FIG. 28 is a flowchart of a resource reclamation process according to an embodiment.

FIG. 28 is a flowchart of a resource reclamation process according to an embodiment.

The resource reclamation process is performed when the processor 53 executes the resource reclamation process program 69. The resource reclamation process is a process executed in step S103 of the resource allocation monitoring process in FIG. 27.

First, the processor 53 executes the process (steps S111 to S113) of loop D. In loop D, the value of variable v is increased by 1 from 1 to the number of volumes introduced in a target resource introduction plan of reclaiming resources, and the processes of steps S111 to S113 are executed using the values of variables v.

In loop D, first, the processor 53 determines whether the usage rate of a pool is smaller than the threshold [warning] ((physical capacity of pool×usage rate)÷(physical capacity-capacity of v-th volume (v-th physical volume))<threshold [warning]) even if resources are reclaimed and the operation rate of the tier of the pool is smaller than the threshold [warning] ((average value of drive operation rate of tier to which v-th volume belongs×number of drives of tier to which v-th volume belongs)÷(number of drives of tier to which v-th volume belongs−number of drives of v-th volume)<threshold [warning]) even if resources are reclaimed (step S111).

As a result, when the usage rate of the pool is smaller than the threshold [warning] even if resources are reclaimed and the operation rate of the tier of the pool is smaller than the threshold [warning] even if resources are reclaimed (step S111: YES), the processor 53 executes the process (steps S112 and S113) of loop E. When the usage rate of the pool is smaller than the threshold [warning] even if resources are reclaimed and the operation rate of the tier of the pool is not smaller than the threshold [warning] even if resources are reclaimed (step S111: NO), the processor 53 exits the process of loop E.

In loop E, the value of variable n is increased by 1 from 1 to the number of faults occurring concurrently and the processes of steps S112 and S113 are executed using the values of variables n.

In loop E, the processor 53 sets values used for calculating E(v,n) (step S112). Here, E(v,n) is the resource introduction plan list table 96 corresponding to the n-th fault occurring concurrently with a fault (occurring fault) occurring presently when it was possible to reclaim a physical volume corresponding to the variable v.

As values used for calculating E(v,n), an operation rate or a use capacity is set to a threshold [warning] corresponding thereto, a change rate [short-term] is set to a largest change rate [short-term] measured in the past, and a grace time is set to a value calculated on the basis of the past largest change rate [short-term] and the threshold [warning].

Subsequently, the processor 53 executes a resource introduction plan calculation process (see FIG. 24) using the values set in step S112 (step S113). According to the process of step S113, the resource introduction plan list table 96 including a resource introduction plan applied when a fault that are likely to occur concurrently with an occurring fault when a physical volume corresponding to the variable v is reclaimed is created.

In loop E, when the processes of steps S112 and S113 end using the variable n as the number of faults occurring concurrently, the processor 53 exits the process of loop E.

In loop D, when the processes of steps S111 to S113 end using the variable v as the number of introduced volumes, the processor 53 exits the process of loop D.

After exiting the process of loop D, the processor 53 executes the process (steps S114 to S116) of loop F. In loop F, the value of variable v is increased by 1 from 1 to the number of volumes introduced in the target resource introduction plan of reclaiming resources, and the processes of steps S114 to S116 are executed using the values of variables v.

In loop F, the processor 53 calculates a combination (a combination of E(v,1)[a], E(v,2)[b], . . . ) of resource introduction plans for all faults that are likely to occur concurrently with an occurring fault (step S114). Here, E(v,n)[a] represents the a-th row in the resource introduction plan list table 96 corresponding to the occurring fault when the physical volume corresponding to the variable v is reclaimed.

Subsequently, the processor 53 calculates the number (N) of faults solvable using a usable drive in all of the calculated combinations (step S115).

Subsequently, the processor 53 sets the largest value among the calculated numbers N as M when the physical volume corresponding to the variable v is removed (step S116). Here, M means the largest number of faults among the faults that are likely to occur concurrently. The value M is an example of a state in which faults that are likely to occur concurrently can be coped with.

In loop F, when the processes of steps S114 to S116 end using the number of introduced volumes as the variable v, the processor 53 exits the process of loop F.

Subsequently, the processor 53 selects the variable v that provides the largest M among variables 1 to v_max (the largest value of the number of introduced volumes) (step S117), updates the related tables among the pool management table 81, the RAID group management table 82, the volume management table 83, and the drive management table 84 to the state when the physical volume corresponding to the selected variable v was reclaimed (step S118), reclaims the physical volume corresponding to the selected variable v (step S119), and sets the present time to the reclamation time 93c of the row corresponding to the resource introduction plan that reclaimed resources in the resource introduction history table 93 (step S120), and the process ends.

According to this resource reclamation process, it is possible to preferentially reclaim a resource in which the number of solvable faults is large when resources are reclaimed.

Figure 29:
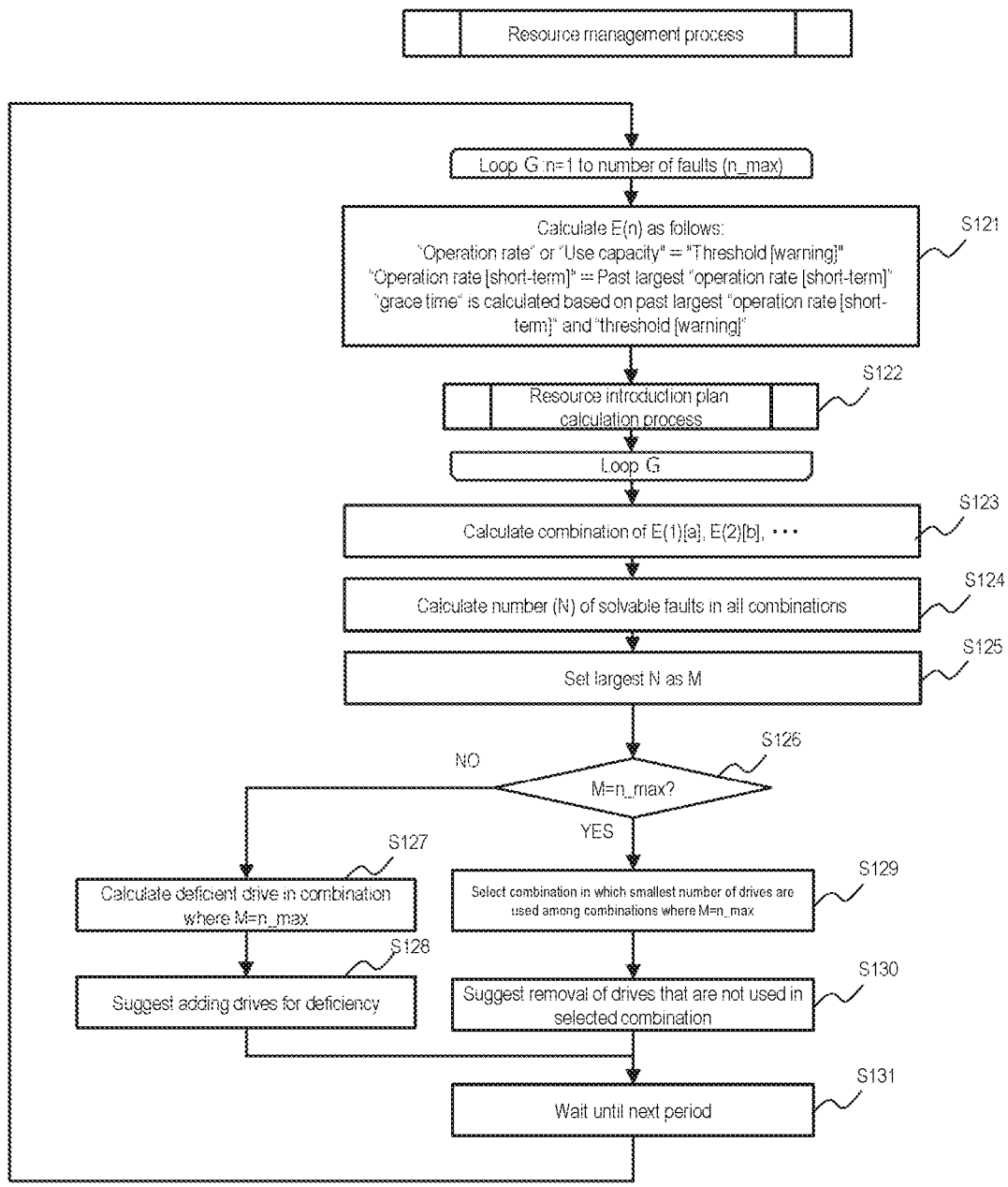
FIG. 29 is a flowchart of a resource management process according to an embodiment.

FIG. 29 is a flowchart of a resource management process according to an embodiment.

The resource management process is performed when the processor 53 executes the resource management process program 66. The resource management process starts being executed after the power of the storage apparatus 30 is turned on, for example, and is executed continuously.

First, the processor 53 executes the process (steps S121 and S122) of loop G. In loop G, the value of variable n is increased by 1 from 1 to the largest number (n_max) of faults that are likely to occur concurrently, and the processes of steps S121 and S122 are executed using the values of variables n.

In loop G, first, the processor 53 sets values used for calculating E(n) (step S121). Here, E(n) is the resource introduction plan list table 96 corresponding to each fault.

As values used for calculating E(n), an operation rate or a use capacity is set to a threshold [warning] corresponding thereto, a change rate [short-term] is set to a largest change rate [short-term] measured in the past, and a grace time is set to a value calculated on the basis of the past largest change rate [short-term] and the threshold [warning].

Subsequently, the processor 53 executes the resource introduction plan calculation process (see FIG. 24) using the values set in step S121 (step S122). According to the process of step S122, the resource introduction plan list table 96 for faults that are likely to occur is created.

When the processes of steps S121 and S122 are performed using the variable n as the largest number of faults that are likely to occur, the processor 53 exits the process of loop G.

Subsequently, the processor 53 calculates a combination (a combination of E(1)[a], E(2)[b], . . . ) of the resource introduction plans for all faults that are likely to occur (step S123).

Subsequently, the processor 53 calculates the number (N) of faults solvable using a usable drive in all of the calculated combinations (step S124). Subsequently, the processor 53 sets the largest value among the calculated numbers N as M which is the largest number of solvable faults among the faults that are likely to occur (step S125). The value M is an example of a state in which faults that are likely to occur concurrently can be coped with.

Subsequently, the processor 53 determines whether M is equal to n_max (step S126).

As a result, when M is not equal to n_max (step S126: NO), it means that the surplus resource is deficient for coping with all faults that are likely to occur concurrently. Therefore, the processor 53 calculates the smallest number among the number of drives deficient when realizing the combination in which M is equal to n_max (step S127) and causes for example, the output device 56 to display a message of suggesting addin deficient number and types of drives (step S128). After that, the flow proceeds to step S131. In this way, it is possible to appropriately suggest adding resources necessary for coping with all faults occurring concurrently.

On the other hand, when M is equal to n_max (step S126: YES), it means that it is possible to cope with all faults that are likely to occur concurrently. Therefore, the processor 53 selects a combination in which the smallest number of drives are used for realizing a combination in which M is equal to n_max (step S129) and causes the output device 56, for example, to display a message of suggesting reducing the number and types of drives that are not used when there are drives that are not used in the selected combination (step S130). After that, the flow proceeds to step S131. In this way, it is possible to appropriately suggest reducing resources that are not necessary for coping with all faults occurring concurrently.

In step S131, the processor 53 stops the processing until the next monitoring period and the flow proceeds to loop G.

As described above, according to the resource management process, it is possible to provide a suggestion so that the number of surplus resources for coping with faults occurring concurrently is adjusted to an appropriate number. Therefore, it is possible to cope with abnormalities appropriately using the minimum necessary surplus resources.

The present invention is not limited to the above-described embodiment but can be changed appropriately without departing from the spirit of the present invention.

For example, in the above-described embodiment, although records corresponding to a low speed are stored in the page migration performance list table 94, the present invention is not limited thereto and, for example, rows corresponding to a plurality of speeds (medium speed, high speed, and the like) maybe stored. In this case, the fields of load corresponding to each speed may be provided in the row of the page migration performance influence list table 95 so that the values of load corresponding to each speed are stored. The load corresponding to a speed when pages are migrated may be specified using this table.

In the above-described embodiment, although the storage controller 50 in the storage apparatus 30 is illustrated as an example of a resource management apparatus, the present invention is not limited thereto, and, for example, another server other than the storage apparatus 30 may execute functions necessary for managing resources of the storage controller 50.

What is claimed is:

1. A resource management apparatus configured to determine a surplus resource introduction plan used for coping with abnormalities in a storage apparatus including a plurality of resources including a plurality of types of surplus resources, and control allocation of the surplus resources according to the determined introduction plan, the resource management apparatus comprising a processor unit, wherein the processor unit is configured to:

detect an abnormality associated with the resource of the storage apparatus;

calculate one or more surplus resource introduction plans capable of coping with the abnormality on the basis of management information of the resource of the storage apparatus when the abnormality is detected; and determine, when there are a plurality of introduction plans, an introduction plan used for coping with the abnormality on the basis of a state in which other abnormalities that are likely to occur concurrently with the abnormality can be coped with, by surplus resources remaining when the introduction plans are executed.

2. The resource management apparatus according to claim 1, wherein the management information of the resource includes configuration information of the resource of the storage apparatus, and operation information of the resource.

3. The resource management apparatus according to claim 2, wherein the processor unit is configured to:

specify, on the basis of the operation information of the resource, a grace time taken for a state associated with the resource to change from a first level of abnormal state to a second level of abnormal state that is severer than the first level of abnormal state; and calculate an introduction plan executable within the grace time.

4. The resource management apparatus according to claim 1, wherein the processor unit is configured to, when there are a plurality of introduction plans, determine an introduction plan in which the number of the other abnormalities that can be coped with by the remaining surplus resources is maximized, as the introduction plan used for coping with the abnormality.

5. The resource management apparatus according to claim 1, wherein the resource is a storage device,
the storage apparatus includes
a physical volume formed by a storage area based on a storage area of one or more storage devices,
a capacity pool based on a storage area of one or more pool volumes, and
a virtual volume to which a storage area of the capacity pool is allocated,
the abnormality associated with the resource includes capacity shortage of the storage area of the capacity pool, and
the processor unit is configured to, when detecting capacity shortage of the storage area of the capacity pool, calculate, as the surplus resource introduction plan capable of coping with the abnormality, an introduction plan of adding, to a resource that forms a physical volume corresponding to the capacity shortage of the capacity pool, a physical volume formed by a surplus resource having an equivalent or higher reliability and an equivalent or higher performance evaluation value.

6. The resource management apparatus according to claim 5, wherein the processor unit is configured to, when capacity shortage of the storage area of the capacity pool is detected, calculate, as the surplus resource introduction plan capable of coping with the abnormality, an introduction plan of adding, to a resource that forms a physical volume corresponding to the capacity shortage of the capacity pool, a physical volume formed by a surplus resource having an equivalent or higher reliability.

7. The resource management apparatus according to claim 6, wherein the processor unit is configured to, when an introduction plan of adding, to a resource that forms a physical volume corresponding to the capacity shortage of the capacity pool, a physical volume formed by a surplus resource having an equivalent or higher reliability is determined as the introduction plan used for coping with the abnormality, rearrange, in a storage area of the added physical volume, pages of a virtual volume to which a storage area of the physical volume corresponding to the capacity shortage is allocated.

8. The resource management apparatus according to claim 1, wherein the resource is a storage device,
the storage apparatus includes a physical volume,
the abnormality associated with the resource includes a performance deficiency, and
the processor unit is configured to, when detecting the performance deficiency, calculate, as the surplus resource introduction plan capable of coping with the abnormality, an introduction plan of adding, to a resource that forms a physical volume corresponding to the performance deficiency, a physical volume formed by a surplus resource having an equivalent or higher reliability and an equivalent or higher performance evaluation value.

9. The resource management apparatus according to claim 1, wherein the processor unit is configured to determine whether the abnormality associated with the resource of the storage apparatus is solved, and
when the abnormality is solved, remove a plurality of surplus resources associated with the introduction plan executed to cope with the abnormality on the basis of a state in which other abnormalities that are likely to occur concurrently with the abnormality can be coped with by removing the surplus resources.

10. The resource management apparatus according to claim 1, wherein the processor unit is configured to, when an abnormality that is likely to occur in the storage apparatus occurs, determine whether a possibility exists to cope with the abnormality and other abnormalities that are likely to occur concurrently with the abnormality, based on one or more surplus resource introduction plans capable of coping with the abnormality, one or more surplus resource introduction plans capable of coping with the other abnormalities that are likely to occur concurrently with the abnormality, and the surplus resources,
when determining that the possibility exists to cope with the abnormality and the other abnormalities, specify types and a number of minimum necessary resources when the abnormality and the other abnormalities are coped with, and
display a message for suggesting to reduce unnecessary types and number of resources on the basis of the types and the number of the surplus resources and the types and the number of the minimum necessary resources.

11. The resource management apparatus according to claim 10, wherein the processor unit is configured to, when determining that the possibility does not exist to cope with the abnormality and the other abnormalities, specify types and the number of minimum necessary resources when the abnormality and the other abnormalities are coped with, and
display a message for suggesting to add deficient types and number of resources on the basis of the types and the number of the surplus resources and the types and the number of the minimum necessary resources.

12. A resource management method executed by a resource management apparatus that determines a surplus resource introduction plan used for coping with abnormalities in a storage apparatus including a plurality of resources including a plurality of types of surplus resources and controls allocation of the surplus resources according to the determined introduction plan, the resource management apparatus;

detects an abnormality associated with the resource of the storage apparatus;
calculates one or more surplus resource introduction plans capable of coping with the abnormality on the basis of management information of the resource of the storage apparatus when the abnormality is detected; and
determines, when there are a plurality of introduction plans, an introduction plan used for coping with the abnormality on the basis of a state in which other abnormalities that are likely to occur concurrently with the abnormality can be coped with, by surplus resources remaining when the introduction plans are executed.

13. A computer-readable nonvolatile recording medium storing a resource management program to be executed by a computer that forms a resource management apparatus that determines a surplus resource introduction plan used for coping with abnormalities in a storage apparatus including a plurality of resources including a plurality of types of surplus resources and controls allocation of the surplus resources according to the determined introduction plan, the resource management program causing the computer to function as:

means for detecting an abnormality associated with the resource of the storage apparatus;

means for calculating one or more surplus resource introduction plans capable of coping with the abnormality on the basis of management information of the resource of the storage apparatus when the abnormality is detected; and means for determining, when there are a plurality of introduction plans, an introduction plan used for coping with the abnormality on the basis of a state in which other abnormalities that are likely to occur concurrently with the abnormality can be coped with, by surplus resources remaining when the introduction plans are executed.

* * * * *